United States Patent
Misra

(10) Patent No.: US 10,372,488 B2
(45) Date of Patent: Aug. 6, 2019

(54) PARALLEL PROCESSING USING MEMORY MAPPING

(71) Applicant: Oracle International Corporation, Redwood Shores, CA (US)

(72) Inventor: Rajeev Kumar Misra, Foster City, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 57 days.

(21) Appl. No.: 15/705,811

(22) Filed: Sep. 15, 2017

(65) Prior Publication Data

US 2018/0095786 A1  Apr. 5, 2018

Related U.S. Application Data

(60) Provisional application No. 62/395,997, filed on Sep. 16, 2016, provisional application No. 62/510,979, filed on May 25, 2017.

(51) Int. Cl.
*G06F 9/48* (2006.01)
*G06F 12/109* (2016.01)
*G06F 9/50* (2006.01)

(52) U.S. Cl.
CPC ............ *G06F 9/4843* (2013.01); *G06F 9/485* (2013.01); *G06F 9/5077* (2013.01); *G06F 12/109* (2013.01); *G06F 2212/1016* (2013.01); *G06F 2212/152* (2013.01); *G06F 2212/657* (2013.01)

(58) Field of Classification Search
CPC .................................................. G06F 9/4843
See application file for complete search history.

(56) References Cited

U.S. PATENT DOCUMENTS

| 6,058,460 | A | 5/2000 | Nakhimovsky |
| 7,647,471 | B2 | 1/2010 | Hastings et al. |
| 8,364,723 | B1 * | 1/2013 | Hseush ............ G06F 17/30592 707/758 |
| 8,407,717 | B2 | 3/2013 | Ho |
| 8,566,536 | B1 | 10/2013 | Brightwell et al. |
| 9,128,818 | B2 | 9/2015 | Wolrich et al. |
| 9,513,966 | B2 | 12/2016 | Canedo et al. |
| 9,536,014 | B1 | 1/2017 | Goldman et al. |

(Continued)

FOREIGN PATENT DOCUMENTS

WO  2013/066010 A1  5/2013

OTHER PUBLICATIONS

Dean el al., MapReduce: simplified data processing on large clusters, Communications of the ACM—50th anniversary issue: 1958 2008 vol. 51 Issue 1, Jan. 2008) (Year: 2008).*

(Continued)

*Primary Examiner* — Charlie Sun
(74) *Attorney, Agent, or Firm* — Kilpatrick Townsend & Stockton LLP

(57) ABSTRACT

Techniques are disclosed for processing records using virtual memory mapping. An input file is virtually divided into a fragments based on memory mapping. Execution threads are started and assigned to each of the fragments. The execution threads process the fragments in parallel and each of the execution threads generates an output file. The output files generated by each of the execution threads are merged to create a final output file.

15 Claims, 36 Drawing Sheets

(56) References Cited

U.S. PATENT DOCUMENTS

| | | | |
|---|---|---|---|
| 9,563,458 | B2 | 2/2017 | King |
| 9,563,697 | B1 | 2/2017 | Caplan |
| 2012/0278586 | A1 | 11/2012 | Caufield et al. |
| 2016/0380927 | A1* | 12/2016 | Vaughn .................. H04L 51/04 709/206 |
| 2017/0199896 | A1 | 7/2017 | Sharma et al. |
| 2017/0255634 | A1* | 9/2017 | Wang ................ G06F 17/30657 |

OTHER PUBLICATIONS

Designing Parallelism into the Data Integration Models, Data Integration Blueprint and Modeling: Techniques for a Scalable and Sustainable Architecture by Anthony David Giordano, published by Pearson/IBM Press, Dec. 2010 https://tdwi.org/Articles/2011/03/30/Excerpt-Data-Integration-Parallelism.aspx?Page=1.

Locality-Aware Parallel Process Mapping for Multi-Core HPC Systems, Hursey et al., 2011 http://faculty.cs.uwlax.edu/~jjhursey/papers/2011/hursey-cluster-poster-2011.pdf.

Inter-Process Communication; powerpoint https://piazza.com/class_profile/get_resource/izf71hzqam8301/j0j5vqr3jpr6ie.

Mapping Files into Memory, Linux System Programming by Robert Love, Publisher O'Reilly Media Inc., Sep. 2007 https://www.safaribooksonline.com/library/view/linux-system-programming/0596009585/ch04s03.html.

Fault Localization Method by Partitioning Memory Using Memory Map and the Stack for Automotive ECU Software Testing, Kwanhyo Kim et al. Department of Electrical and Computer Engineering, Ajou University, 2016. www.mdpi.com/2076-3417/6/9/266/pdf.

A Partitioning Method for Processing Large Data Files, Anshuman Panigrahi et al. https://www.researchgate.net/file.PostFileLoader.html?id=52a1eb4dd11b8bb9388b46e6&assetKey=AS%3A272179327897629%401441904016724.

* cited by examiner

Input File

| DATE | OPERATION | CURRENCY | ACCOUNT NUMBER | AMOUNT |
|---|---|---|---|---|
| 3/1/2016 | Balance Transfer | USD | 1212 | 20000 |
| 3/1/2016 | Balance Transfer | USD | 4111 | 1000 |
| 3/1/2016 | Balance Transfer | USD | 1212 | 2000 |
| 3/1/2016 | Balance Transfer | USD | 4111 | 10000 |
| 3/1/2016 | Balance Transfer | USD | 1212 | 2000 |
| 3/2/2016 | Balance Transfer | USD | 4111 | 1000 |
| 3/2/2016 | Balance Transfer | USD | 1212 | 2000 |
| 3/3/2016 | Balance Transfer | USD | 4111 | 10000 |
| 3/3/2016 | Balance Transfer | USD | 1212 | 30000 |
| 3/3/2016 | Balance Transfer | USD | 4111 | 40000 |
| 3/4/2016 | Balance Transfer | USD | 1212 | 10000 |
| 3/4/2016 | Balance Transfer | USD | 4111 | 2000 |
| 3/4/2016 | Balance Transfer | USD | 1212 | 1000 |
| 3/4/2016 | Balance Transfer | USD | 4111 | 3000 |
| 3/5/2016 | Balance Transfer | USD | 1212 | 5000 |
| 3/5/2016 | Balance Transfer | USD | 4111 | 1000 |
| 3/5/2016 | Balance Transfer | USD | 1212 | 20000 |
| 3/5/2016 | Balance Transfer | USD | 4111 | 10000 |
| 3/5/2016 | Balance Transfer | USD | 1212 | 30000 |
| 3/5/2016 | Balance Transfer | USD | 1212 | 20000 |

Record Processor

FIG. 1

Input File

| DATE | OPERATION | CURRENCY | ACCOUNT NUMBER | AMOUNT |
|---|---|---|---|---|
| 3/1/2016 | Balance Transfer | USD | 1212 | 20000 |
| 3/1/2016 | Balance Transfer | USD | 4111 | 1000 |
| 3/1/2016 | Balance Transfer | USD | 1212 | 2000 |
| 3/1/2016 | Balance Transfer | USD | 4111 | 10000 |
| 3/1/2016 | Balance Transfer | USD | 1212 | 2000 |
| 3/2/2016 | Balance Transfer | USD | 4111 | 1000 |
| 3/2/2016 | Balance Transfer | USD | 1212 | 2000 |
| 3/3/2016 | Balance Transfer | USD | 4111 | 10000 |
| 3/3/2016 | Balance Transfer | USD | 1212 | 30000 |
| 3/3/2016 | Balance Transfer | USD | 4111 | 40000 |
| 3/4/2016 | Balance Transfer | USD | 1212 | 10000 |
| 3/4/2016 | Balance Transfer | USD | 4111 | 2000 |
| 3/4/2016 | Balance Transfer | USD | 1212 | 1000 |
| 3/4/2016 | Balance Transfer | USD | 4111 | 3000 |
| 3/5/2016 | Balance Transfer | USD | 1212 | 5000 |
| 3/5/2016 | Balance Transfer | USD | 4111 | 1000 |
| 3/5/2016 | Balance Transfer | USD | 1212 | 20000 |
| 3/5/2016 | Balance Transfer | USD | 4111 | 10000 |
| 3/5/2016 | Balance Transfer | USD | 1212 | 30000 |
| 3/5/2016 | Balance Transfer | USD | 1212 | 20000 |

Record Processor

Output File

| | |
|---|---|
| 1212 | 20000 |
| 4111 | 1000 |
| 1212 | 2000 |
| 4111 | 10000 |
| 1212 | 2000 |
| 4111 | 1000 |
| 1212 | 2000 |
| 4111 | 10000 |
| 1212 | 30000 |
| 4111 | 40000 |

*FIG. 11*

```
<?xml version="1.0"?>
<xsd:schema nxsd:encoding="ASCII" nxsd:stream="chars" nxsd:version="NXSD" attributeFormDefault="unqualified" elementFormDefault="qualified"
targetNamespace="http://TargetNamespace.com/fileReference" xmlns:tns="http://TargetNamespace.com/fileReference"
xmlns:nxsd="http://xmlns.oracle.com/pcbpel/nxsd" xmlns:xsd="http://www.w3.org/2001/XMLSchema">
    <xsd:element name="InputSet">
        <xsd:complexType>
            <xsd:sequence>
                <xsd:element ref="tns:Input" maxOccurs="unbounded" minOccurs="1"/>
            </xsd:sequence>
        </xsd:complexType>
    </xsd:element>
    <xsd:element name="Input" type="tns:InputType"/>
    <xsd:complexType name="InputType">
        <xsd:sequence>
            <xsd:element name="DATE" type="xsd:string" nxsd:quotedBy="" nxsd:terminatedBy=" " nxsd:style="terminated"/>
            <xsd:element name="OPERATION" type="xsd:string" nxsd:quotedBy="" nxsd:terminatedBy=" " nxsd:style="terminated"/>
            <xsd:element name="CURRENCY" type="xsd:string" nxsd:quotedBy="" nxsd:terminatedBy=" " nxsd:style="terminated"/>
            <xsd:element name="ACCOUNT_NUMBER" type="xsd:string" nxsd:quotedBy="" nxsd:terminatedBy=" " nxsd:style="terminated"/>
            <xsd:element name="AMOUNT" type="xsd:string" nxsd:quotedBy="" nxsd:terminatedBy="${eol}" nxsd:style="terminated"/>
        </xsd:sequence>
    </xsd:complexType>
</xsd:schema>
```

FIG. 26

| DATE | OPERATION | CURRENCY | ACCOUNT | AMOUNT |
|---|---|---|---|---|
| 3/1/2016 | Balance Transfer | USD | 1212 | 20000 |
| 3/1/2016 | Balance Transfer | USD | 4111 | 1000 |
| 3/1/2016 | Balance Transfer | USD | 1212 | 2000 |
| 3/1/2016 | Balance Transfer | USD | 4111 | 10000 |
| 3/1/2016 | Balance Transfer | USD | 1212 | 2000 |
| 3/2/2016 | Balance Transfer | USD | 4111 | 1000 |
| 3/2/2016 | Balance Transfer | USD | 1212 | 2000 |
| 3/3/2016 | Balance Transfer | USD | 4111 | 10000 |
| 3/3/2016 | Balance Transfer | USD | 1212 | 30000 |
| 3/3/2016 | Balance Transfer | USD | 4111 | 40000 |
| 3/4/2016 | Balance Transfer | USD | 1212 | 10000 |
| 3/4/2016 | Balance Transfer | USD | 4111 | 2000 |
| 3/4/2016 | Balance Transfer | USD | 1212 | 1000 |
| 3/4/2016 | Balance Transfer | USD | 4111 | 3000 |
| 3/5/2016 | Balance Transfer | USD | 1212 | 5000 |
| 3/5/2016 | Balance Transfer | USD | 4111 | 1000 |
| 3/5/2016 | Balance Transfer | USD | 1212 | 20000 |
| 3/5/2016 | Balance Transfer | USD | 4111 | 10000 |
| 3/5/2016 | Balance Transfer | USD | 1212 | 30000 |
| 3/5/2016 | Balance Transfer | USD | 1212 | 20000 |

| DATE | OPERATION | CURRENCY | ACCOUNT NUMBER | AMOUNT |
|---|---|---|---|---|
| 3/1/2016 | Balance Transfer | USD | 1212 | 20000 |
| 3/1/2016 | Balance Transfer | USD | 4111 | 1000 |
| 3/1/2016 | Balance Transfer | USD | 1212 | 2000 |
| 3/1/2016 | Balance Transfer | USD | 4111 | 10000 |
| 3/1/2016 | Balance Transfer | USD | 1212 | 2000 |
| 3/2/2016 | Balance Transfer | USD | 4111 | 1000 |
| 3/2/2016 | Balance Transfer | USD | 1212 | 2000 |
| 3/3/2016 | Balance Transfer | USD | 4111 | 10000 |
| 3/3/2016 | Balance Transfer | USD | 1212 | 30000 |
| 3/3/2016 | Balance Transfer | USD | 4111 | 40000 |
| 3/4/2016 | Balance Transfer | USD | 1212 | 10000 |
| 3/4/2016 | Balance Transfer | USD | 4111 | 2000 |
| 3/4/2016 | Balance Transfer | USD | 1212 | 1000 |
| 3/4/2016 | Balance Transfer | USD | 4111 | 3000 |
| 3/5/2016 | Balance Transfer | USD | 1212 | 5000 |
| 3/5/2016 | Balance Transfer | USD | 4111 | 1000 |
| 3/5/2016 | Balance Transfer | USD | 1212 | 20000 |
| 3/5/2016 | Balance Transfer | USD | 4111 | 10000 |
| 3/5/2016 | Balance Transfer | USD | 1212 | 30000 |
| 3/5/2016 | Balance Transfer | USD | 1212 | 20000 |

FIG. 30

First record of each fragment processed in parallel and its fragment output file generated

| DATE | OPERATION | CURRENCY | ACCOUNT NUMBER | AMOUNT |
|---|---|---|---|---|
| 3/1/2016 | Balance Transfer | USD | 1212 | 20000 |
| 3/1/2016 | Balance Transfer | USD | 4111 | 1000 |
| 3/1/2016 | Balance Transfer | USD | 1212 | 2000 |
| 3/1/2016 | Balance Transfer | USD | 4111 | 10000 |
| 3/1/2016 | Balance Transfer | USD | 1212 | 2000 |
| 3/2/2016 | Balance Transfer | USD | 4111 | 1000 |
| 3/2/2016 | Balance Transfer | USD | 1212 | 2000 |
| 3/3/2016 | Balance Transfer | USD | 4111 | 10000 |
| 3/3/2016 | Balance Transfer | USD | 1212 | 30000 |
| 3/3/2016 | Balance Transfer | USD | 4111 | 40000 |
| 3/4/2016 | Balance Transfer | USD | 1212 | 10000 |
| 3/4/2016 | Balance Transfer | USD | 4111 | 2000 |
| 3/4/2016 | Balance Transfer | USD | 1212 | 1000 |
| 3/5/2016 | Balance Transfer | USD | 4111 | 3000 |
| 3/5/2016 | Balance Transfer | USD | 1212 | 5000 |
| 3/5/2016 | Balance Transfer | USD | 4111 | 1000 |
| 3/5/2016 | Balance Transfer | USD | 1212 | 20000 |
| 3/5/2016 | Balance Transfer | USD | 4111 | 10000 |
| 3/5/2016 | Balance Transfer | USD | 1212 | 30000 |
| 3/5/2016 | Balance Transfer | USD | 1212 | 20000 |

| DATE | OPERATION | CURRENCY | ACCOUNT NUMBER | AMOUNT |
|---|---|---|---|---|
| 3/1/2016 | Balance Transfer | USD | 1212 | 20000 |
| 3/1/2016 | Balance Transfer | USD | 4111 | 1000 |
| 3/1/2016 | Balance Transfer | USD | 1212 | 2000 |
| 3/1/2016 | Balance Transfer | USD | 4111 | 10000 |
| 3/2/2016 | Balance Transfer | USD | 1212 | 2000 |
| 3/3/2016 | Balance Transfer | USD | 4111 | 1000 |
| 3/3/2016 | Balance Transfer | USD | 1212 | 2000 |
| 3/3/2016 | Balance Transfer | USD | 4111 | 10000 |
| 3/4/2016 | Balance Transfer | USD | 1212 | 30000 |
| 3/4/2016 | Balance Transfer | USD | 4111 | 40000 |
| 3/4/2016 | Balance Transfer | USD | 1212 | 10000 |
| 3/4/2016 | Balance Transfer | USD | 4111 | 2000 |
| 3/5/2016 | Balance Transfer | USD | 1212 | 1000 |
| 3/5/2016 | Balance Transfer | USD | 4111 | 30000 |
| 3/5/2016 | Balance Transfer | USD | 1212 | 5000 |
| 3/5/2016 | Balance Transfer | USD | 4111 | 1000 |
| 3/5/2016 | Balance Transfer | USD | 1212 | 20000 |
| 3/5/2016 | Balance Transfer | USD | 4111 | 10000 |
| 3/5/2016 | Balance Transfer | USD | 1212 | 30000 |
| 3/5/2016 | Balance Transfer | USD | 1212 | 20000 |

*FIG. 32*

PARALLEL PROCESSING USING MEMORY MAPPING

CROSS-REFERENCES TO RELATED APPLICATIONS

This application claims priority to U.S. Provisional Patent Application No. 62/395,997 filed on Sep. 16, 2016 in the United States Patent and Trademark Office, entitled "PARALLEL PROCESSING USING MEMORY MAPPING," and U.S. Provisional Patent Application No. 62/510,979, filed on May 25, 2017 in the United States Patent and Trademark Office, entitled "INTEGRATION CLOUD SERVICE" the disclosures of which are incorporated by reference in their entirety.

BACKGROUND

The present disclosure relates generally to parallel processing using memory mapping. Specifically, techniques disclosed relate to performing parallel processing on a file in conjunction with a memory mapping of the file.

In file integration scenarios, an input file may contain a large number of homogeneous records. A user specifies logic for a record processor, which processes each record in the file and transforms each of the records into another form. Currently, a record processor goes through each record in the file one-by-one and applies the transformation on each record. That is, bulk file-based integration is performed for large files. When a file is large, this process can take a long time before all of the records are processed.

FIGS. 1-21 illustrate an example of processing records serially. FIGS. 1-21 show 20 records (e.g., dated from Mar. 1, 2016-Mar. 5, 2016). The record processor 120 can contain logic for reading a native record from a file, converting the native record into an XML format using an input schema, applying processing logic specified by a user, converting the output XML record back into the native format (e.g., comma separated value (CSV)) using an output schema, and writing the converted native record to an output file.

As shown in FIGS. 1-21, the record processor 120 serially processes each of the records 110. For example, in FIG. 2 the first record is processed, in FIG. 3, the second record is processed, and so on until all of the records are processed. Serially processing records can be a time consuming, lengthy and inefficient process.

Alternatively, a large file can be physically divided into smaller files However, the initial breakdown can be expensive since each file would need its own disk space. Also, complicated synchronization would need to be performed. In addition, read and/or write system calls would be required that would involve switching from a user mode to a kernel mode, which can be expensive.

BRIEF SUMMARY

The example embodiments provide techniques (including methods, systems, devices, code or computer program stored on a computer-readable non-transitory memory and comprising instructions executable by one or more processors) for performing parallel processing using memory mapping.

In example embodiments, parallel processing can be performed without synchronization.

When one execution thread or record processor is busy performing an input/output (I/O) for reading records from a file, the other execution threads can utilize the idle CPU to do translation from the native format. Therefore, system resources are better utilized.

In an example embodiment, an input file is received and virtually divided into a plurality of fragments through memory mapping. An execution thread is started for each of the plurality of fragments, and each of the execution threads are assigned a fragment. The plurality of fragments are processed in parallel by the execution threads. Each of the execution threads outputs an output file corresponding to the fragment is has processed. The output files are merged to create a final output file.

Certain embodiments are directed to systems, portable consumer devices, and computer readable media associated with the methods described herein.

A better understanding of the nature and advantages of the example embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which:

FIGS. 1-21 illustrate an example of serially processing records.

FIG. 26 illustrates an example of an input schema file, in accordance with some example embodiments.

FIG. 27 illustrates an example of an input file record, in accordance with some example embodiments.

FIGS. 28-33 illustrate parallel processing records, in accordance with some example embodiments.

DETAILED DESCRIPTION

Figure 2:
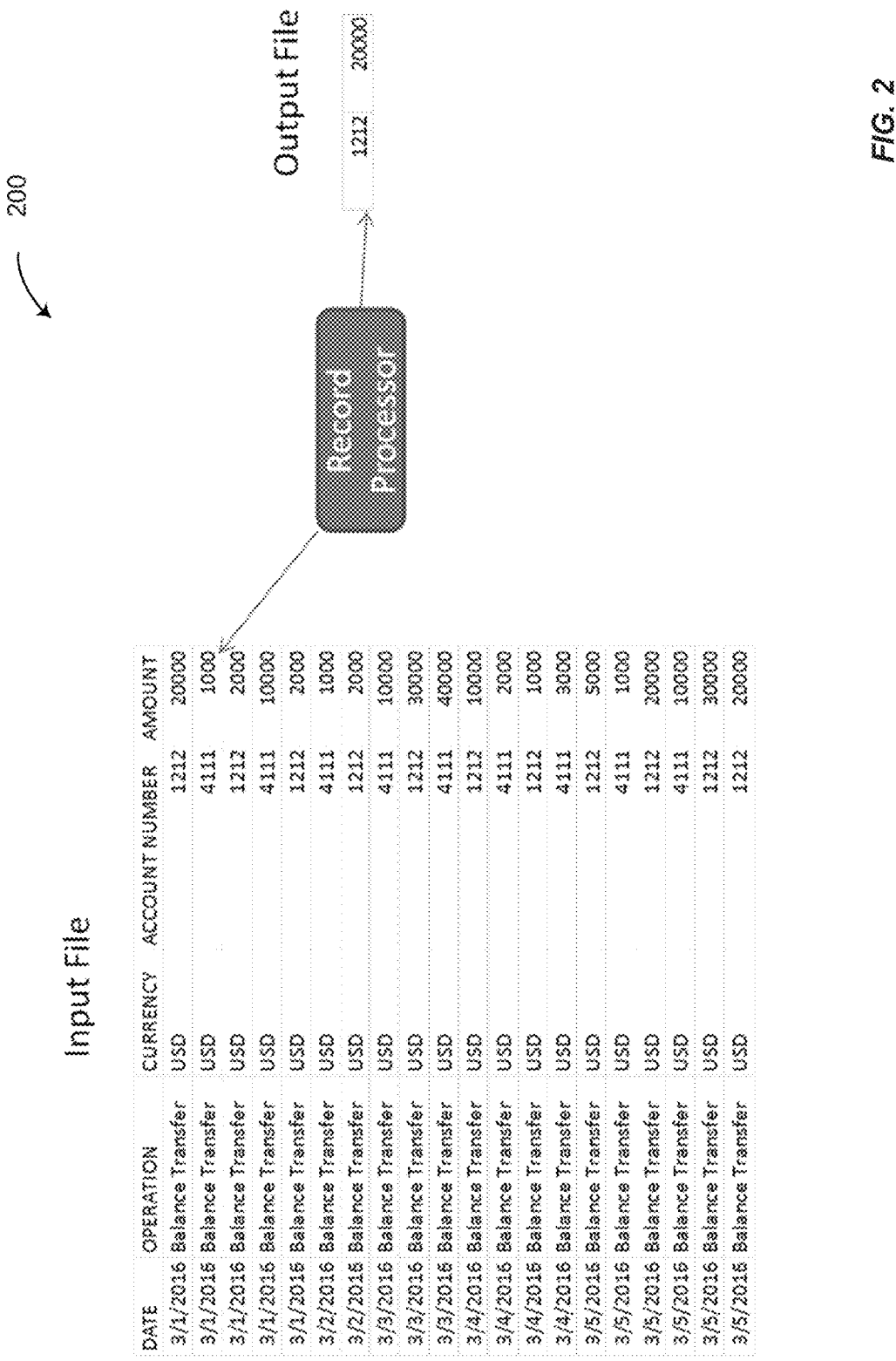
Figure 3:
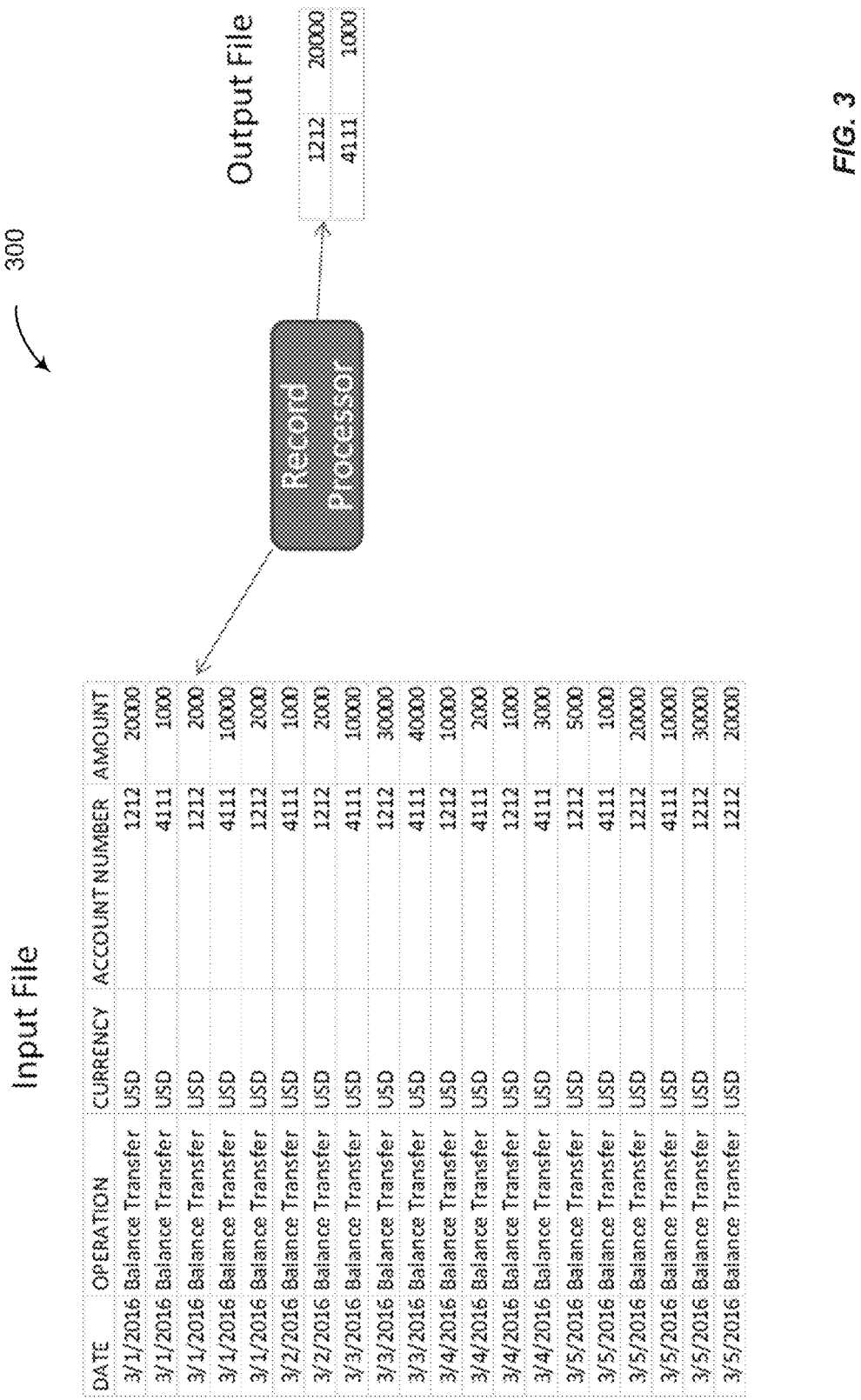
Figure 4:
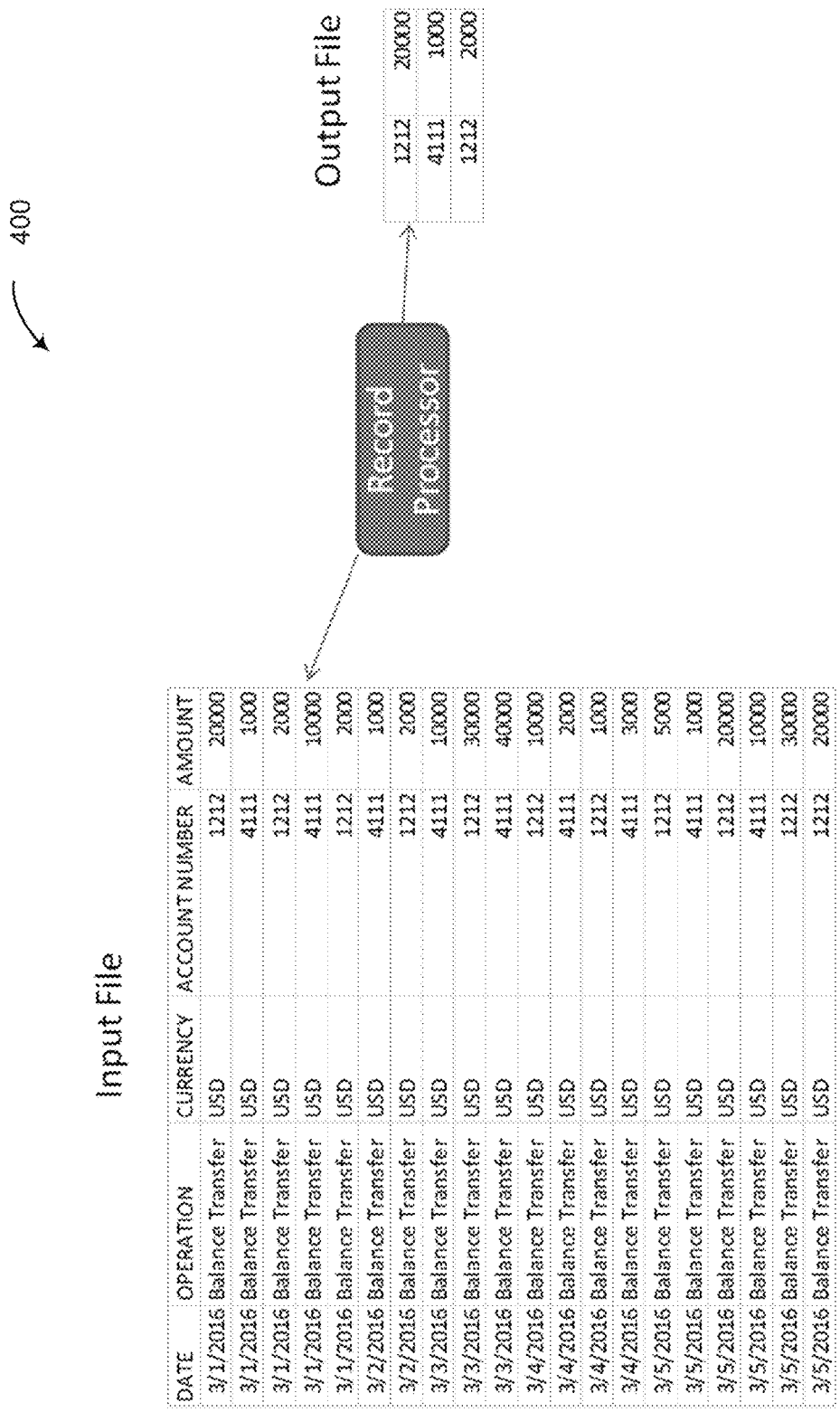
Figure 5:
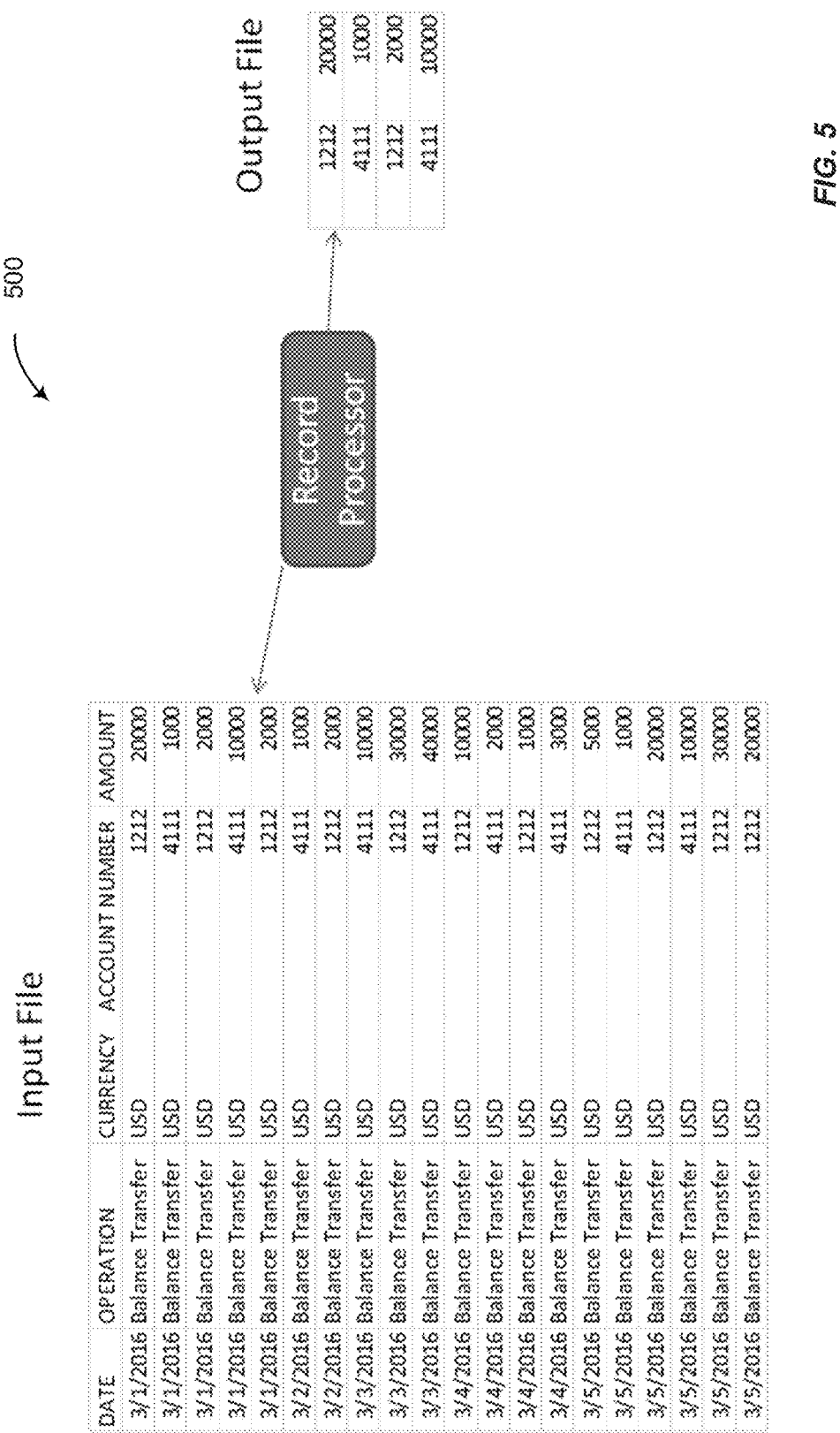
Figure 6:
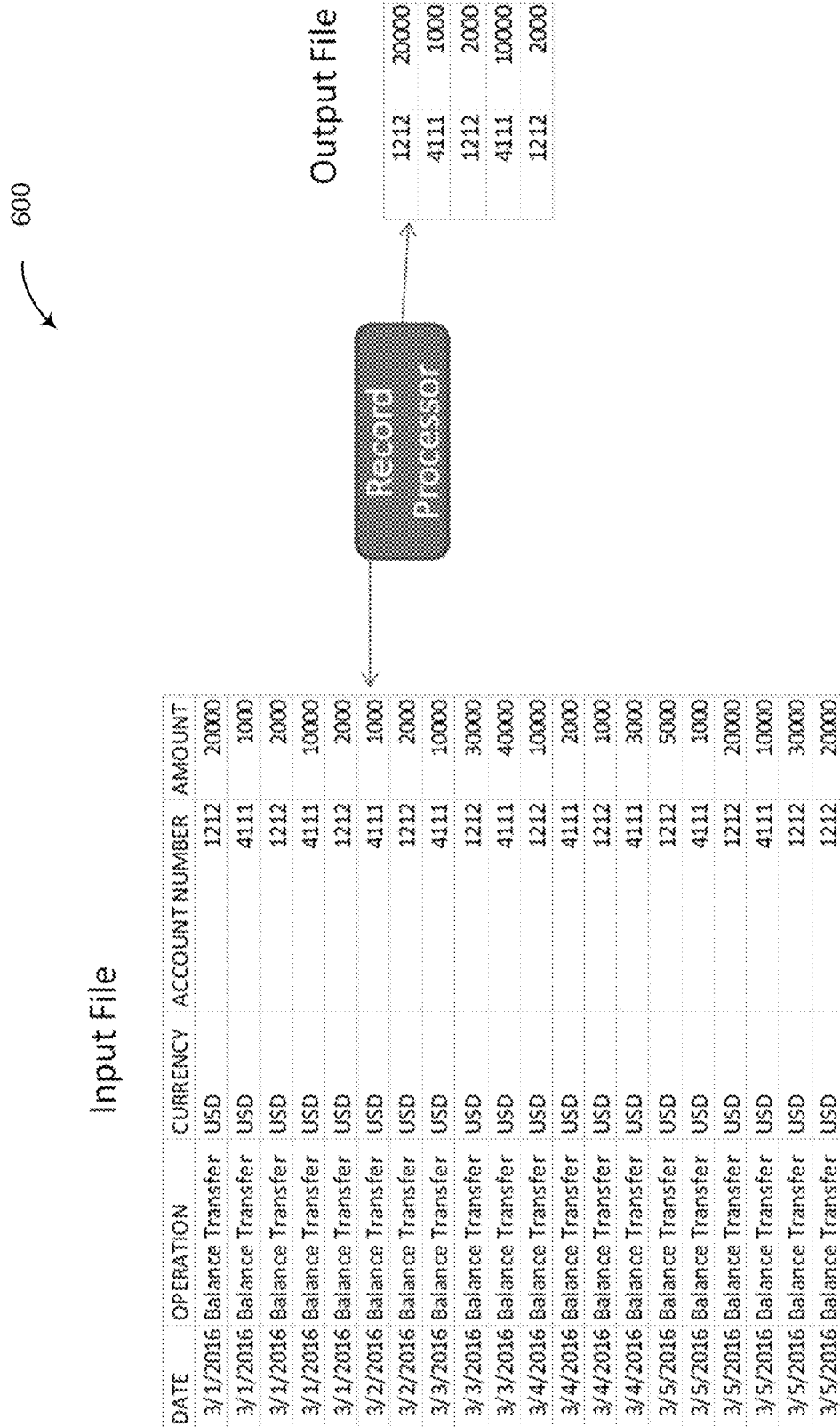
Figure 7:
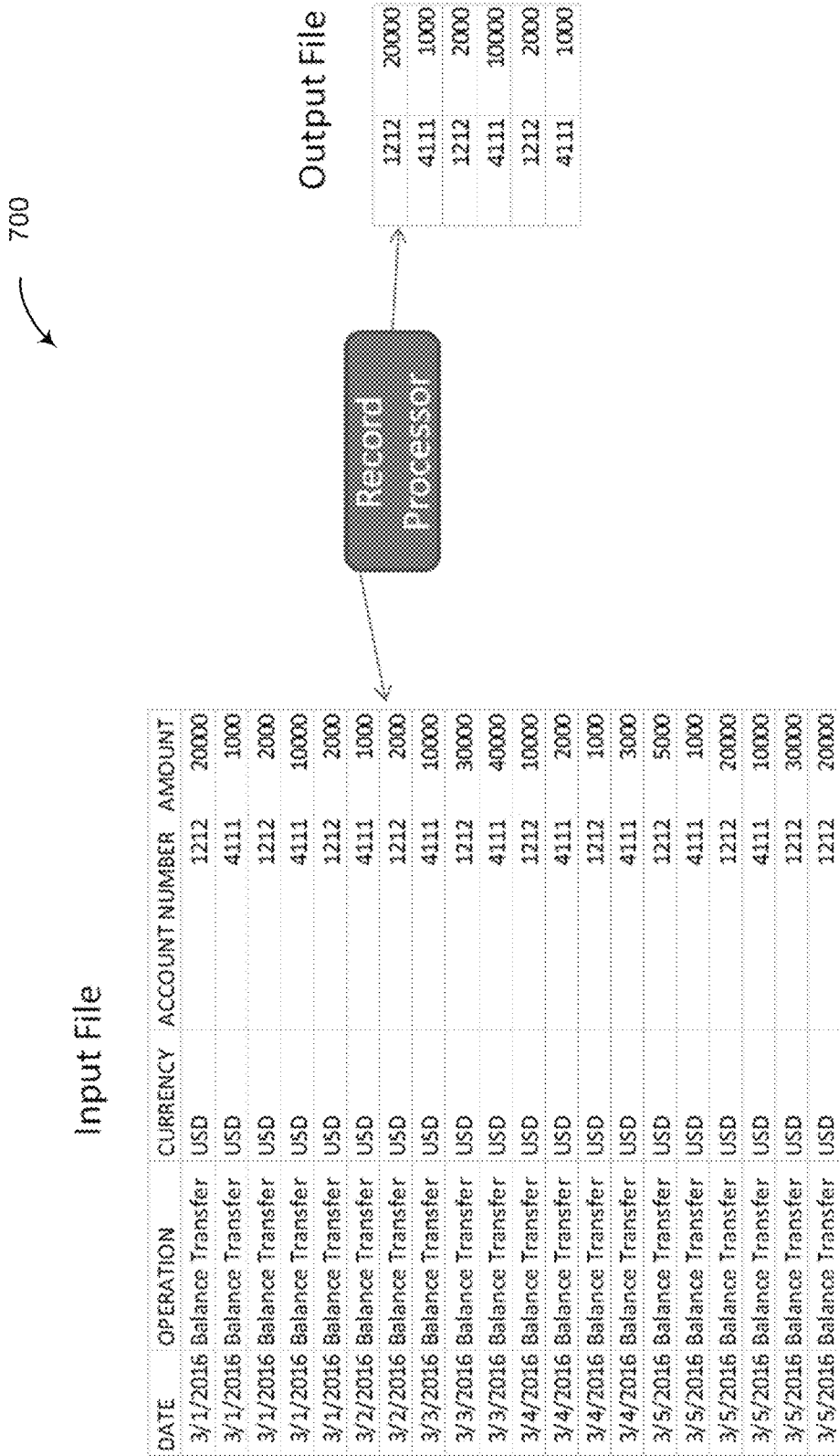
Figure 8:
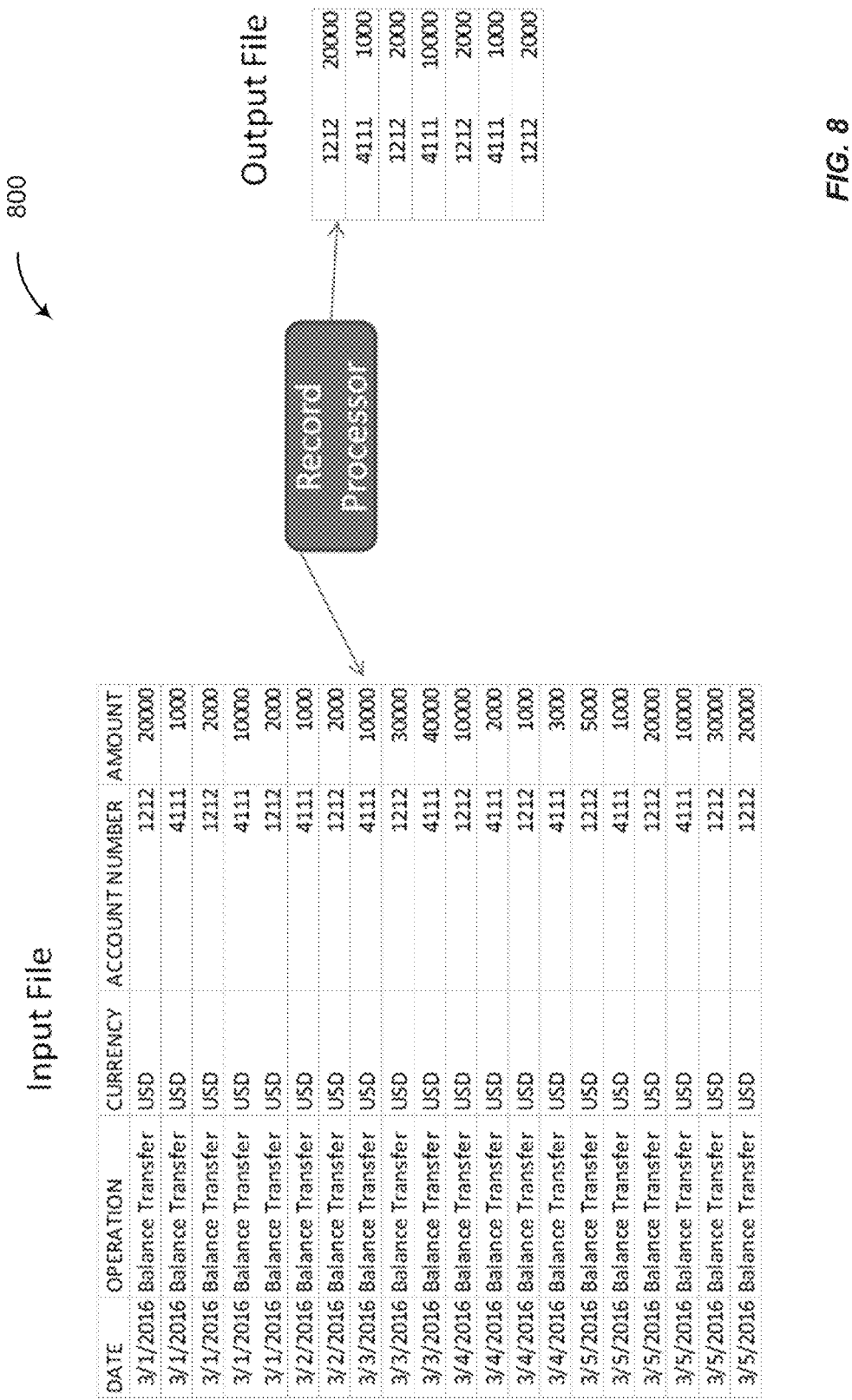
Figure 9:
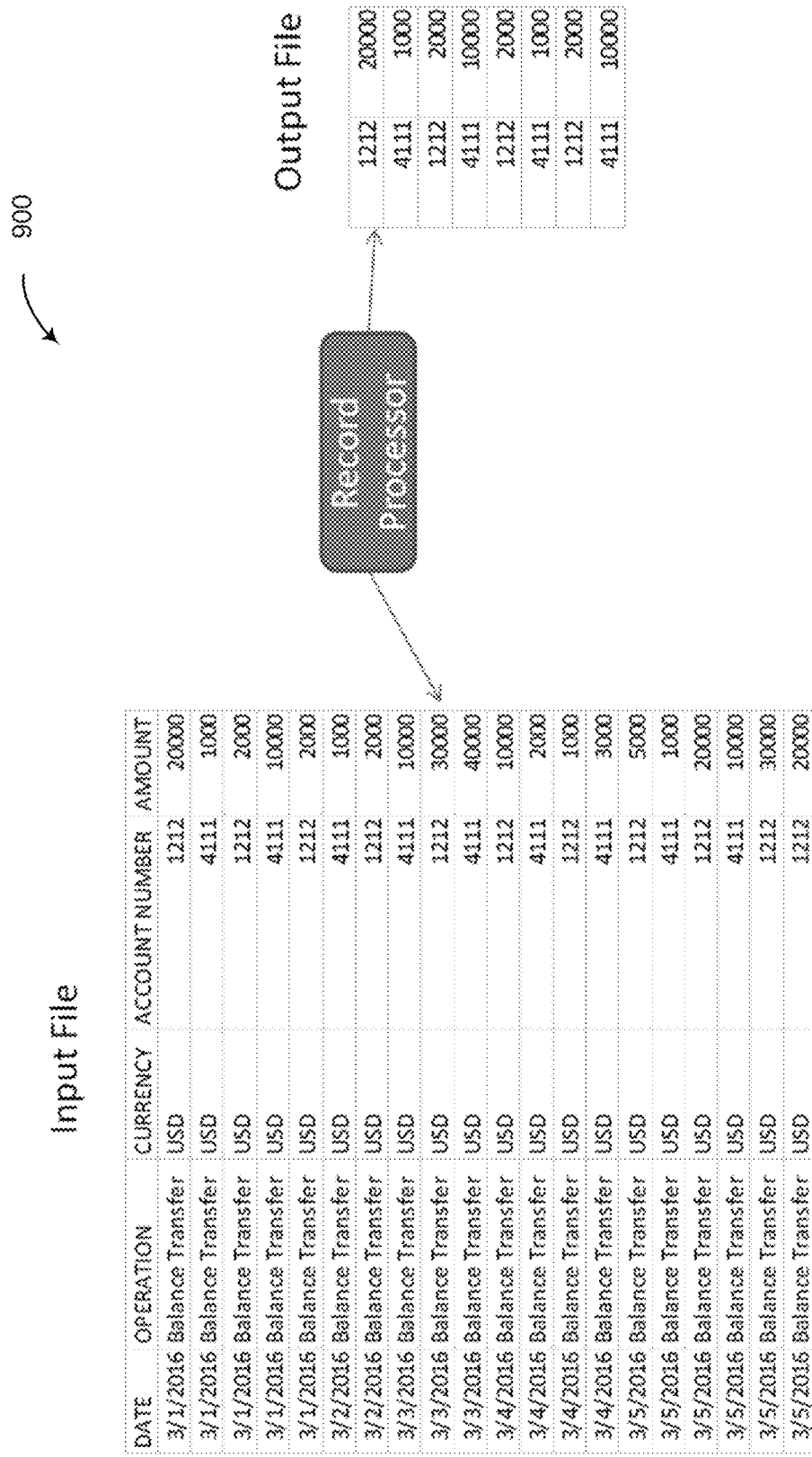
Figure 10:
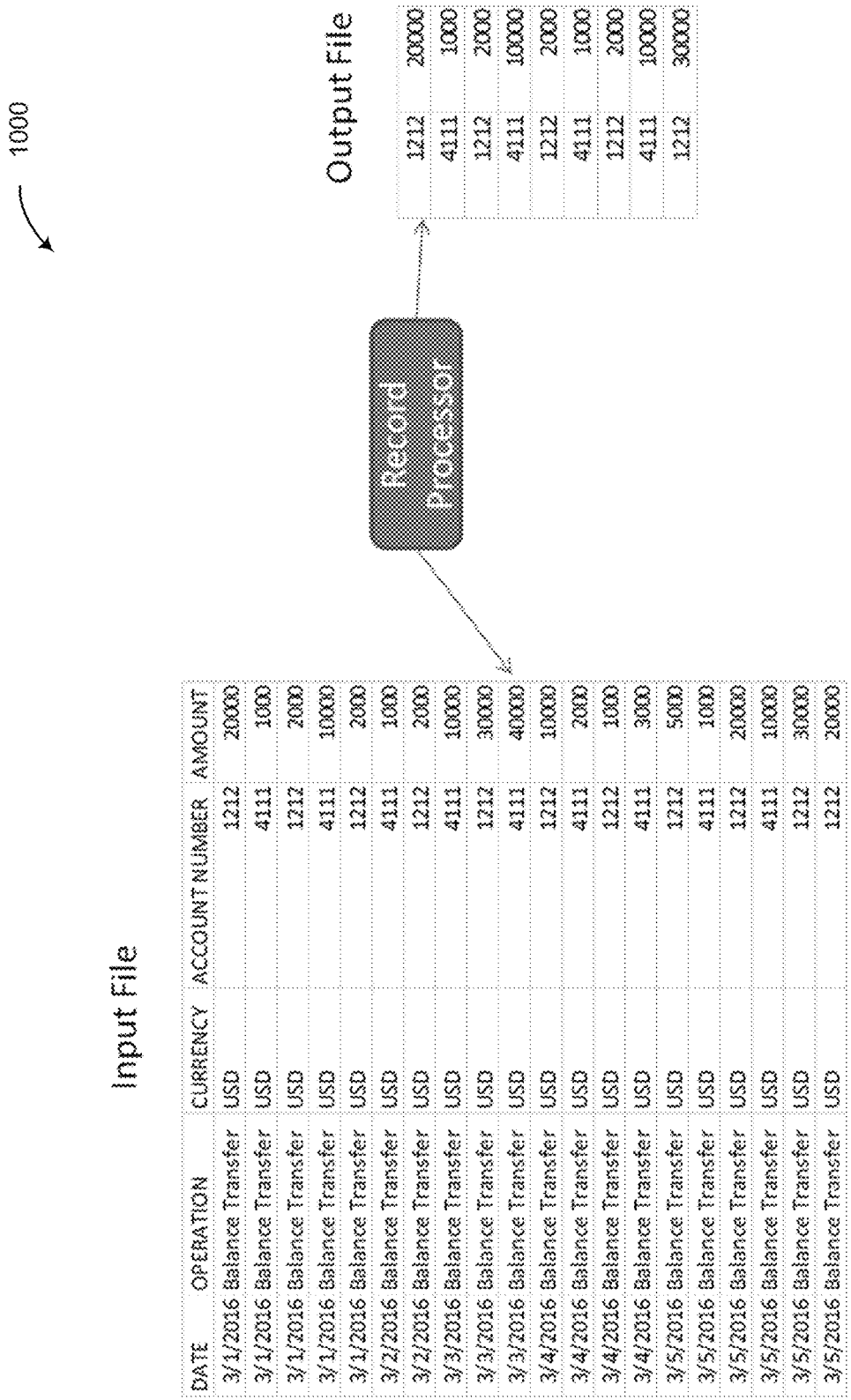
Figure 12:
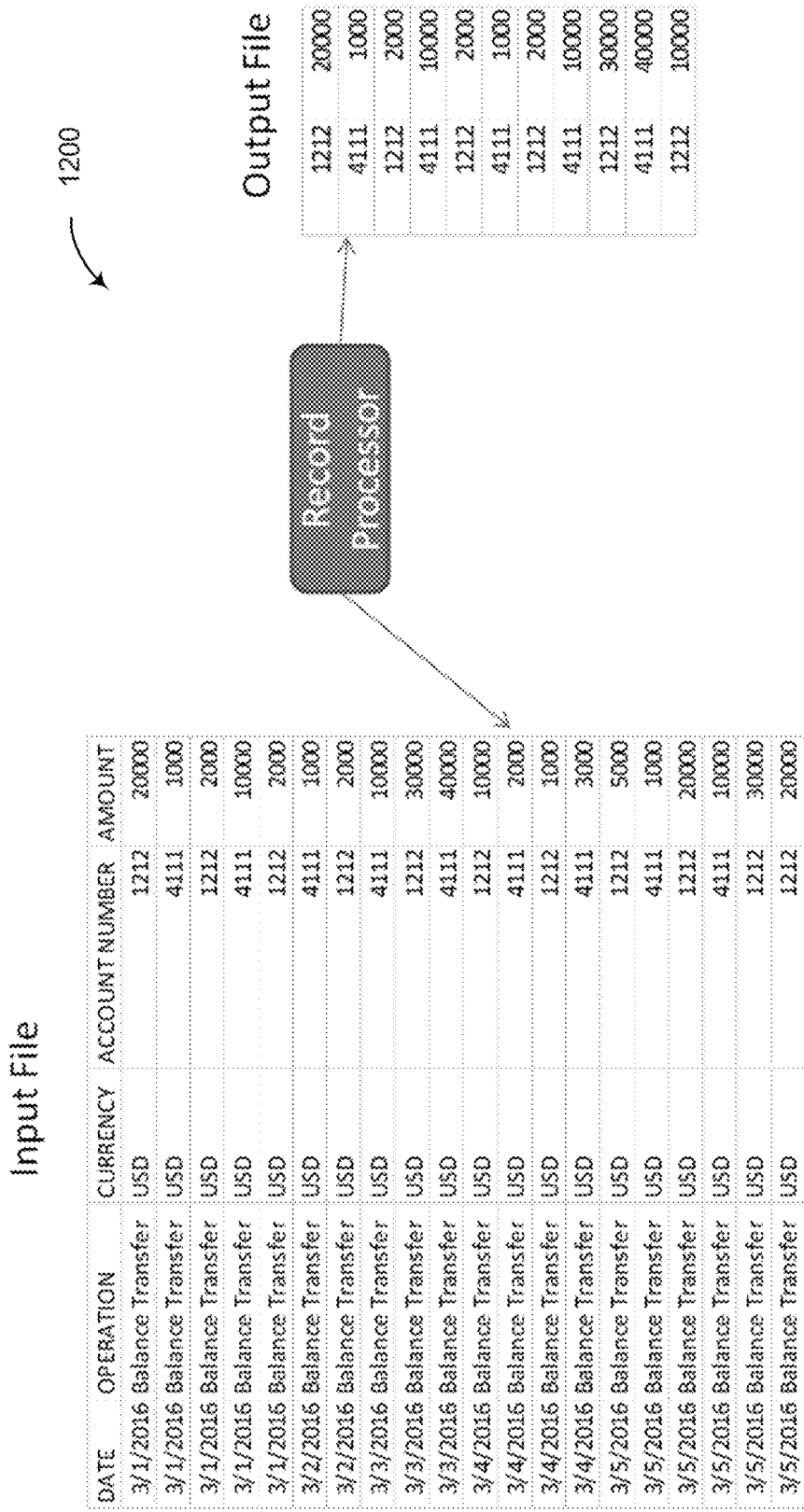
Figure 13:
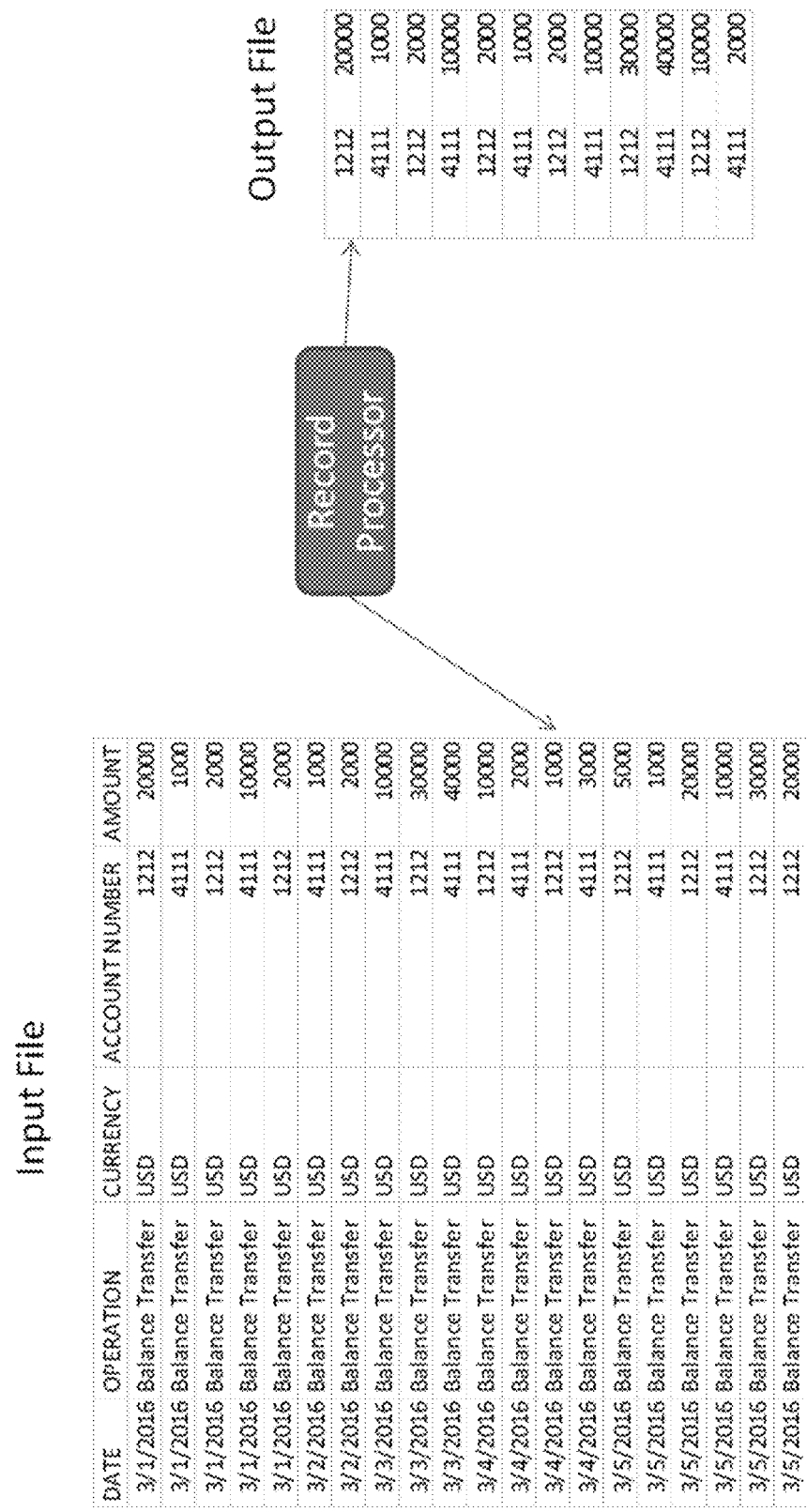
Figure 14:
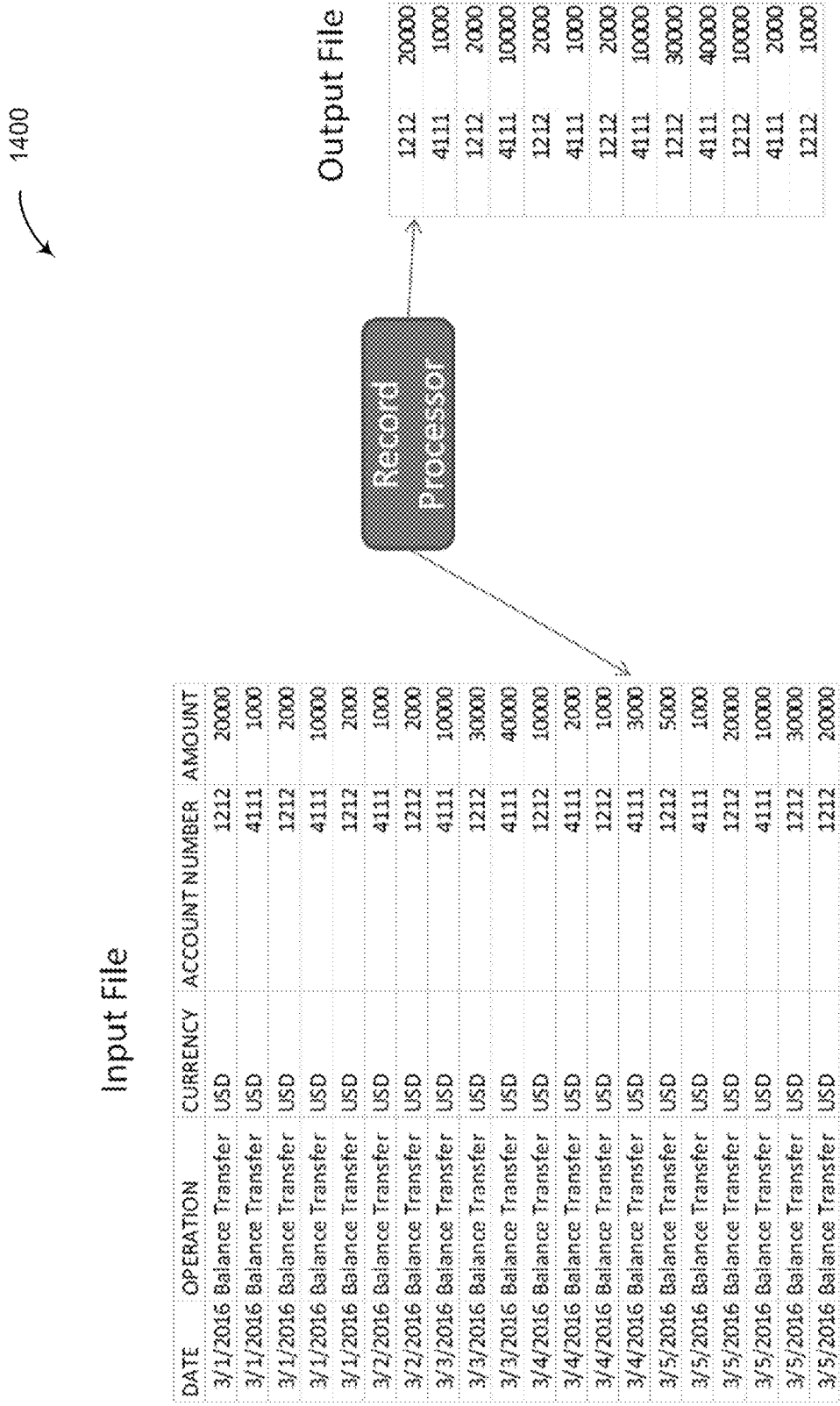
Figure 15:
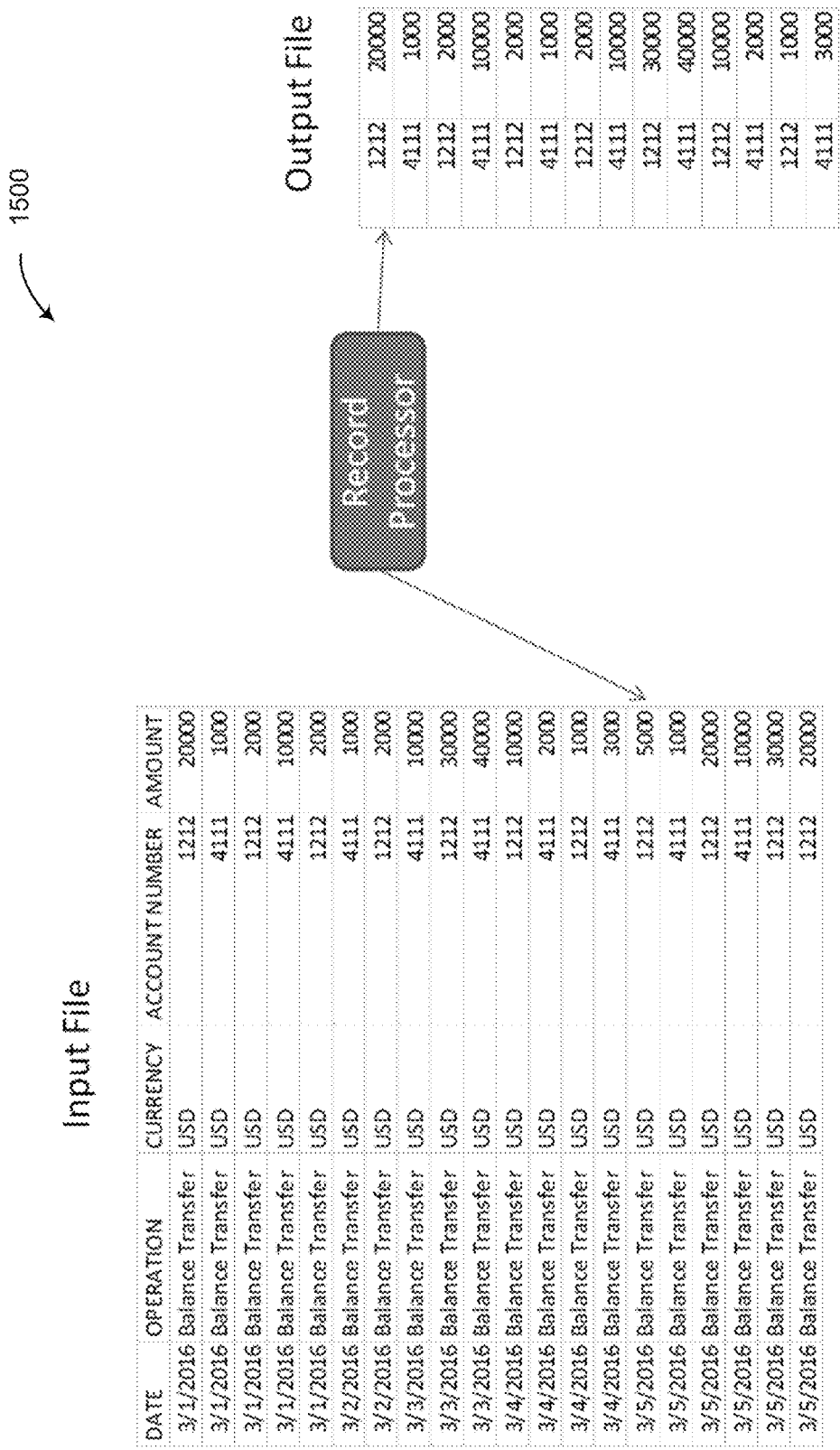
Figure 16:
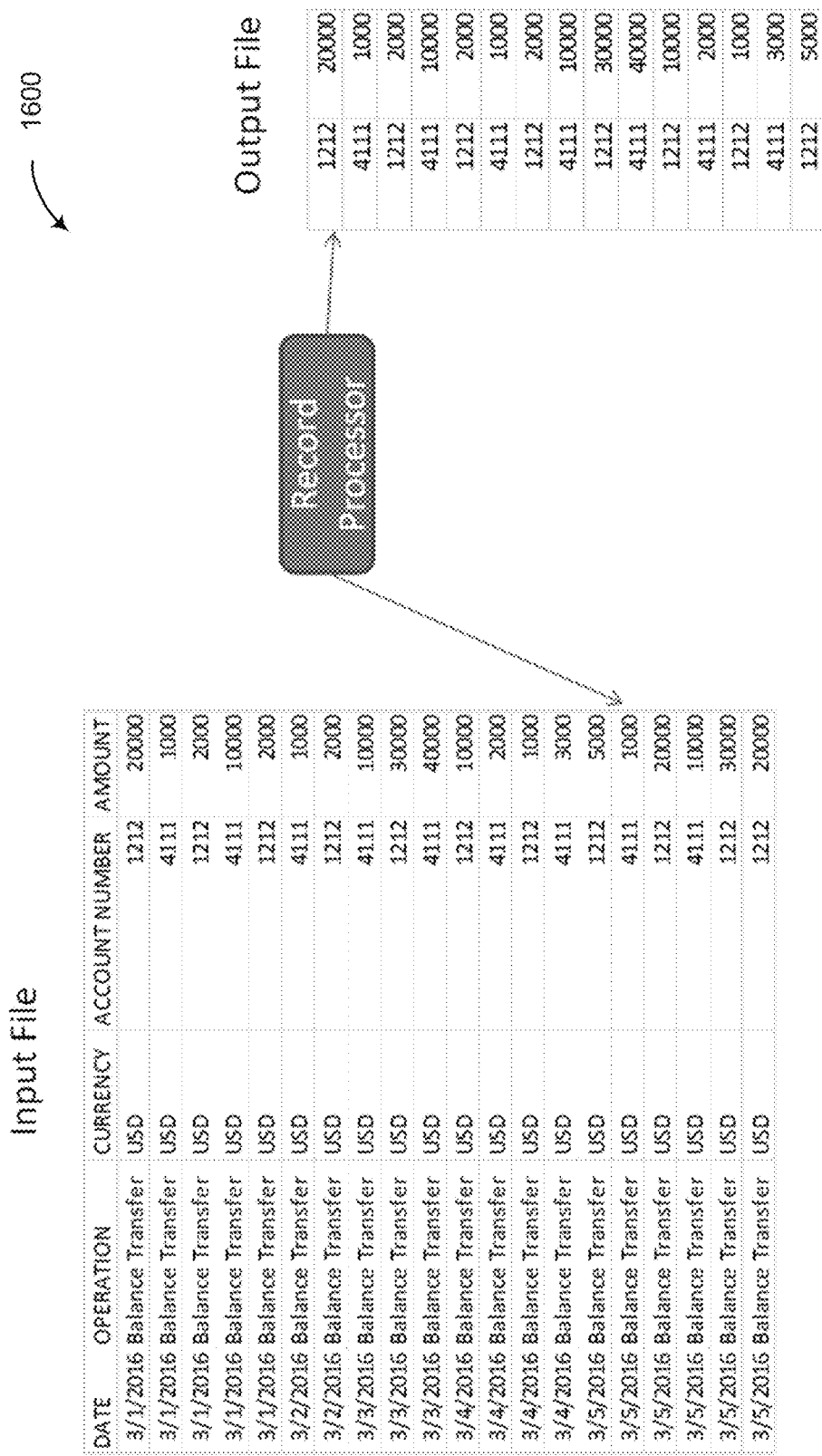
Figure 17:
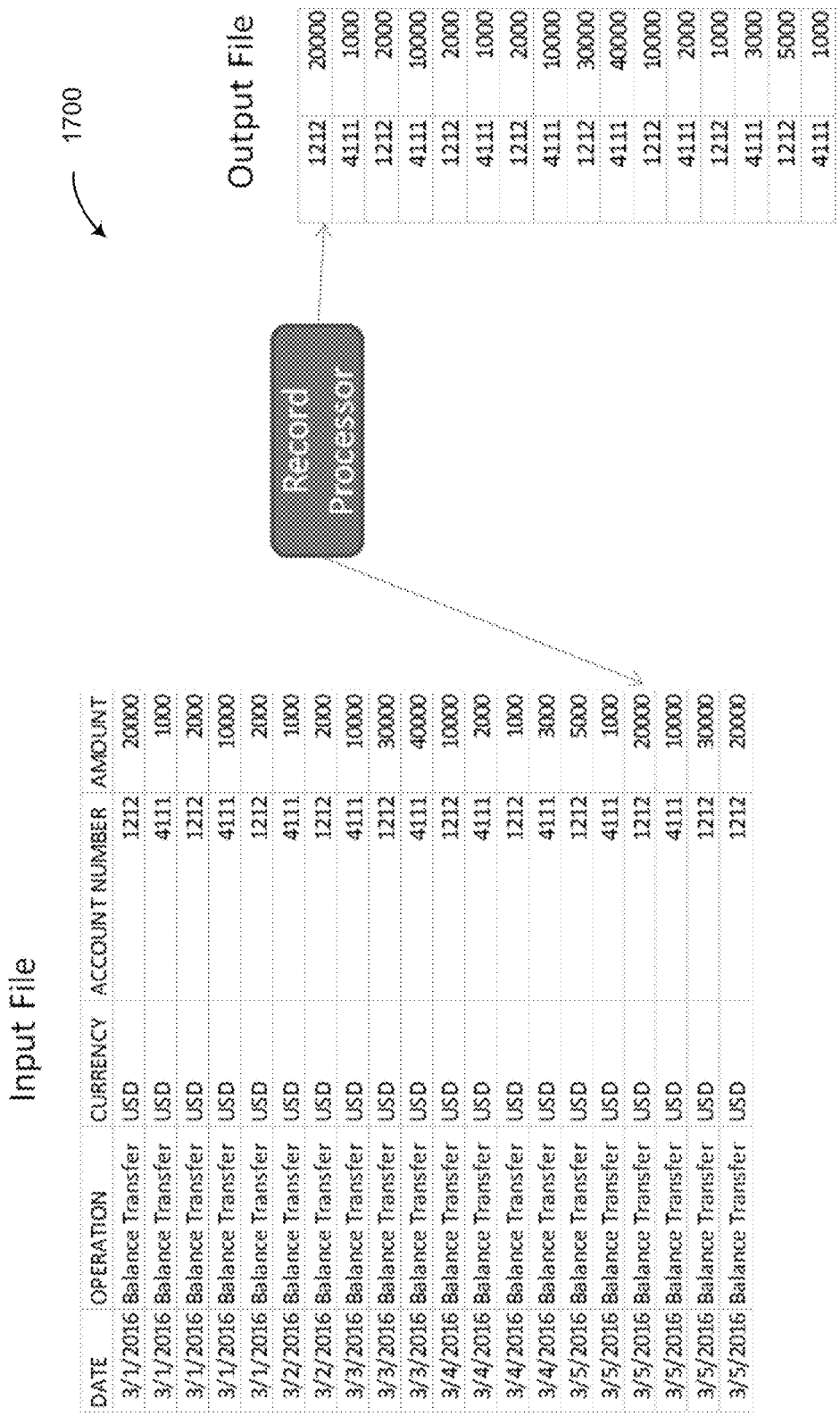
Figure 18:
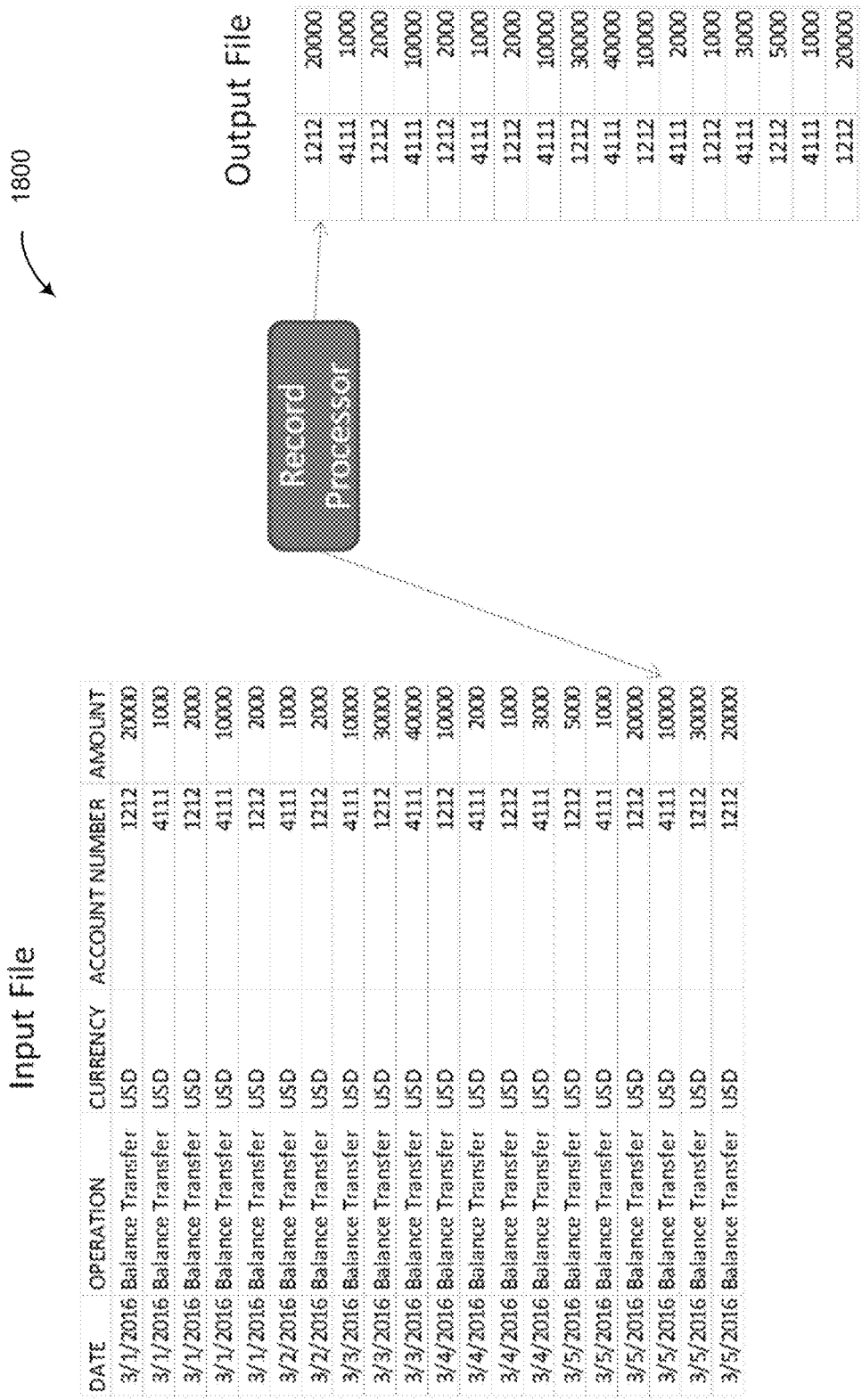
Figure 19:
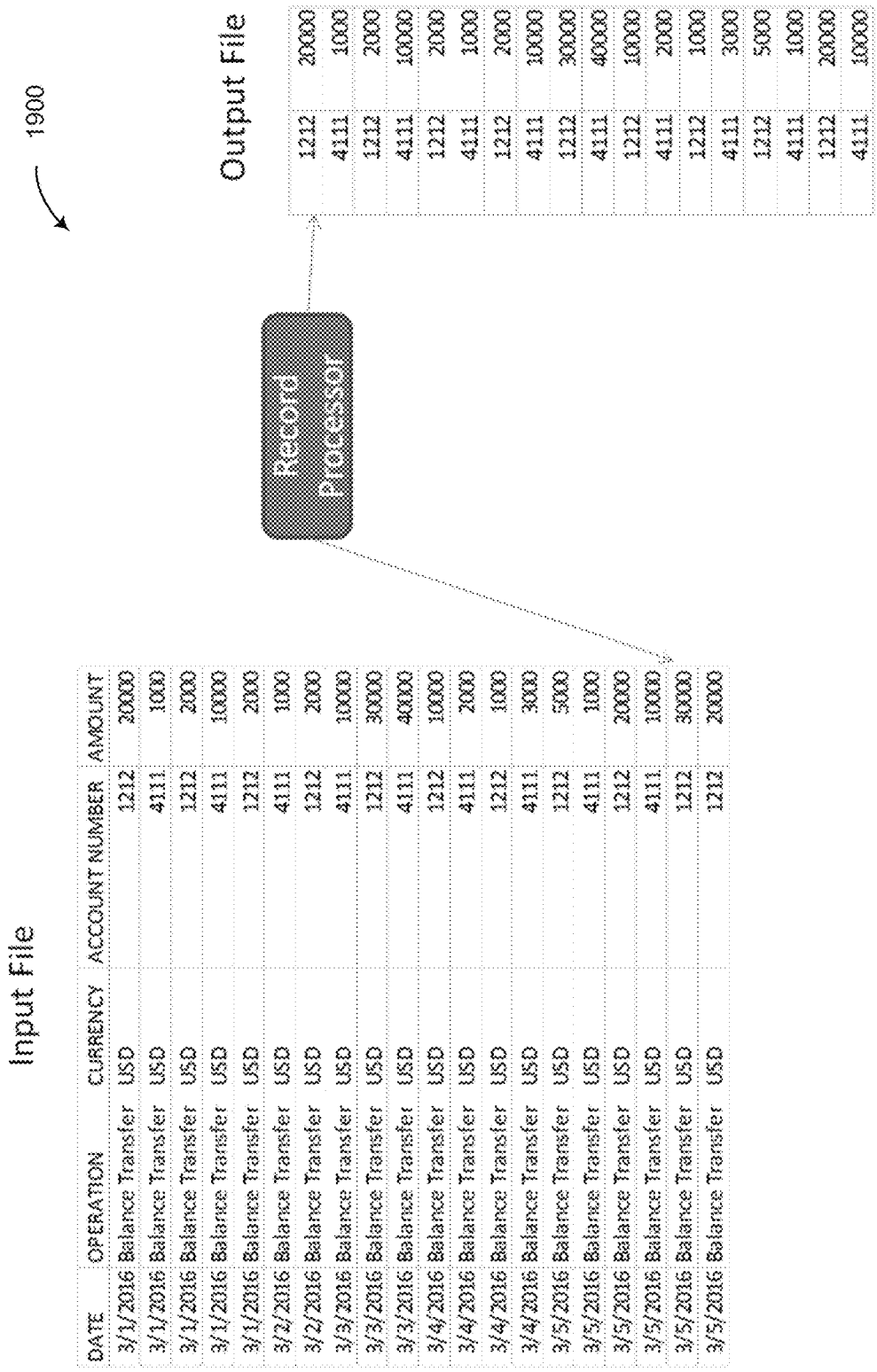
Figure 20:
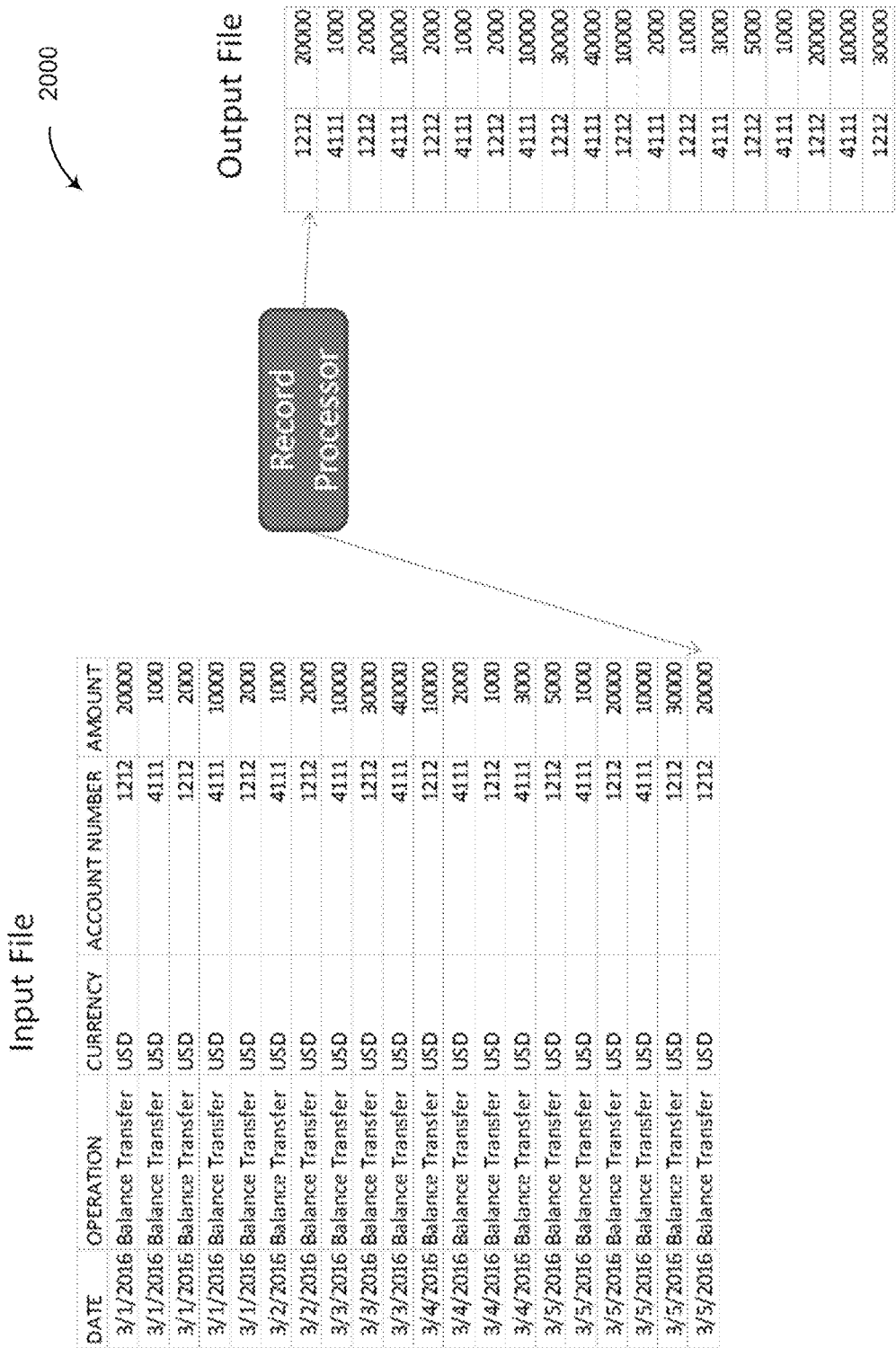
Figure 21:
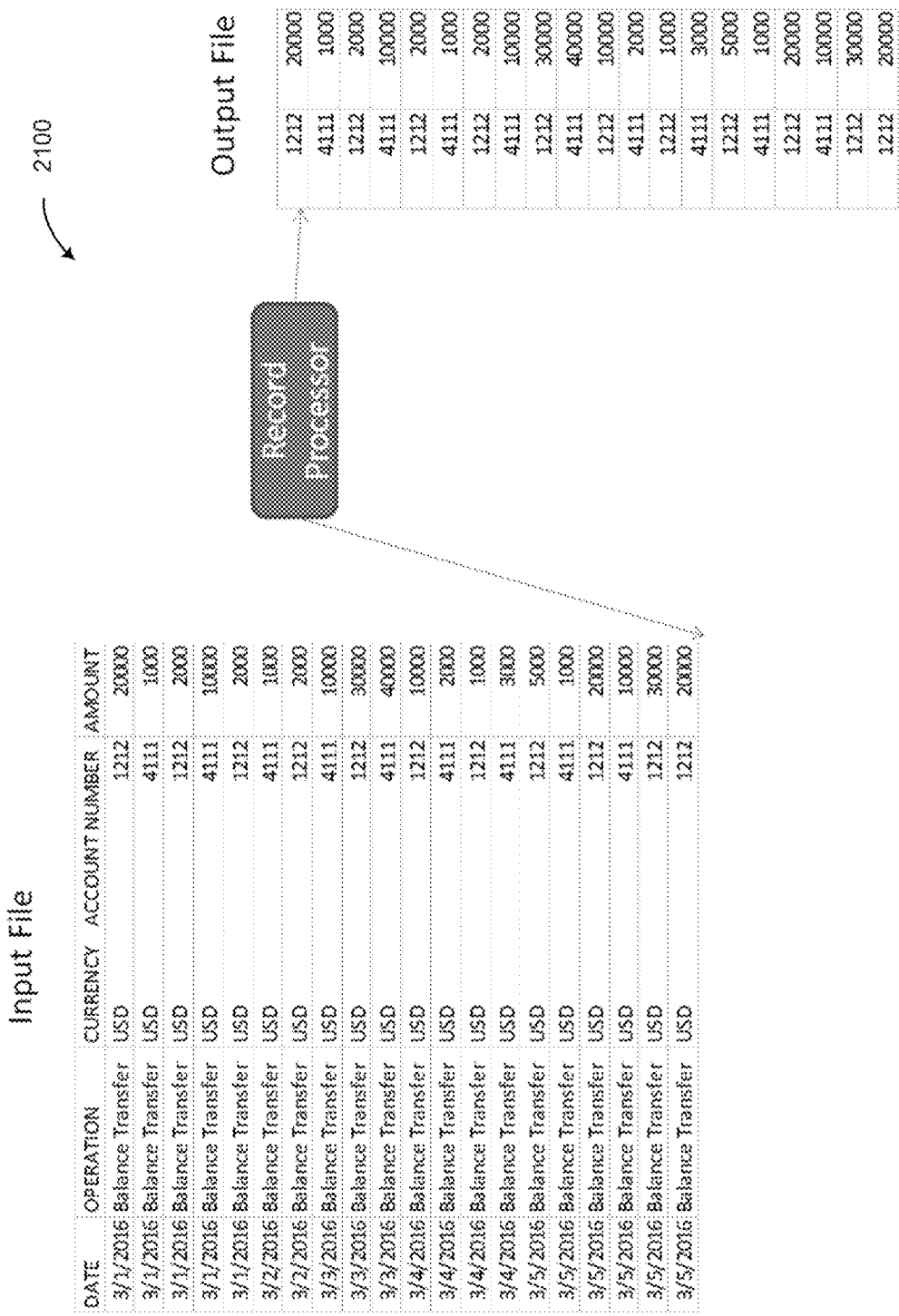

In the following description, for the purposes of explanation, specific details are set forth in order to provide a thorough understanding of the exemplary embodiments. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

In accordance with some embodiments, a memory mapping technique is used to logically divide a file into multiple fragments using memory mapped regions. Each execution thread is assigned a specific memory mapped region of the file for processing records. An execution thread can also be called a record processor or a worker thread. Each execution thread can process records in the file in parallel without requiring complicated synchronization. In addition, read and/or write system calls are not required, which can reduce costs.

In an example embodiment, a large file is divided virtually into small fragments through file memory mapping. Instead of physically breaking down an input file, memory mapping is performed to virtually break down the file into multiple fragments and assign memory mapped regions or fragments to individual threads for processing. Therefore, the initial input/output (I/O) for breaking the file is almost zero.

Memory mapping involves manipulating page tables by operating system to map content of file within a virtual address space of an operating system process. Data from a file is accessed using a virtual address instead of, for example, a read system call that is more costly. When accessing or loading some data of a file using a virtual address that is marked "not present" in a page table, a memory management unit (MMU) can cause a page fault and a page is loaded from a file by the operating system. A mapping of virtual address to physical address or more accurately a mapping of virtual page to physical page, may not be present since not all virtual addresses may be mapped to a physical address. When a virtual address is accessed by a process, an operating system (e.g. Linux) works with the Memory Management Unit (MMU) to walk through page table entries and look at corresponding page table entries to find out if physical memory is allocated for a given virtual address. For example, this can be indicated by a bit in page table entry. If not, a page fault exception is raised, a physical frame is allocated, and data is brought from backing store to this physical page frame if required, such as from memory mapped file, as in an example embodiment, or from swap space. A page table entry is updated to map virtual address to physical frame. An MMU can be part of a computer motherboard. The MMU can transform the linear virtual address into physical address using a hardware circuit called Paging Unit. The loading of the page data from the file is directly through a file system, for example, through a Linux's EXT3 file system and not through a read system call.

Memory mapping can provide access to content of a file from a certain region of file. A region of a file has a start offset into the file and a length. Once a region has been memory mapped and assigned to a record processor, that region acts as if the file has been broken into a small fragment. The record processor is looking at smaller fragments because the record processor can only see content in its own assigned memory mapped region through a handle. A handle can be a starting virtual address of a memory mapped region. The handle can be used by a process to read data from a file as if the process was reading some data from the virtual address.

Figure 22:
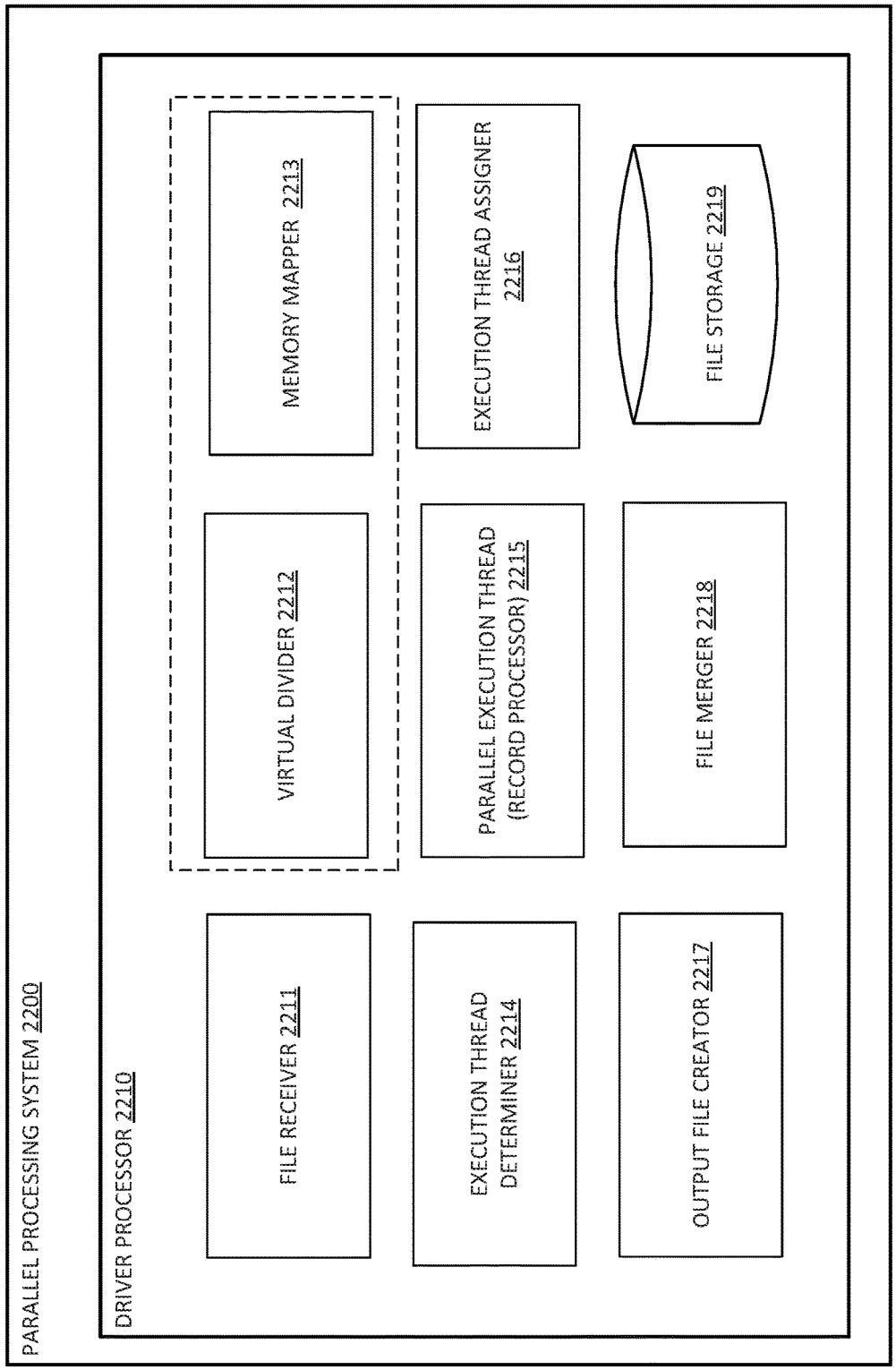
FIG. 22 illustrates a block diagram of a system for processing records in parallel, in accordance with some example embodiments.

FIG. 22 illustrates a block diagram of a system 2200 for processing records in parallel, in accordance with some example embodiments. The system 2200 can be stored on a cloud or located on premise, for example, at a location of a user.

As shown in FIG. 22, parallel processing system 2200 includes a driver processor 2210, file receiver 2211, virtual divider 2212, memory mapper 2213, execution thread determiner 2214, parallel execution thread 2215, execution thread assigner 2216, output file creator 2217, file merger 2218 and file storage 2219. An execution thread can also be known as a record processor. Execution thread and record processor will be used interchangeably in the specification.

Driver processor 2210 can include the orchestration logic that manages the whole parallel processing system 2200. The driver processor 2210 can manage the flow for performing the virtual parallel processing of records. The driver processor can look at a file size and a number of CPU's available on a system can calculate a start address (or offset) and a length of each fragment. The driver processor can provide the calculated information to, for example, execution threads.

The file receiver 2211 can receive an input file. The input file can be stored in file storage 2219. A user can design the integration process using utilities. The utilities can include, for example, an integrated development environment (IDE), such as Jdeveloper or a Web based user interface (UI). The input file can also correspond to files in cloud integration services. For example, cloud integration services may use the example embodiments for File Based Data Integration (FBDI), where a large file is downloaded to, for example, a cloud server (e.g., a pod) from a user defined FTP server. The parallel processing, as disclosed in the example embodiments, can be used to process one or more user files.

During design time, the user specifies the input file location. Further, the user specifies the location of a final output file. The user can provide a schema file for describing a structure of input file, such as a native XML, schema definition (XSD) (native XSD) file. The input schema file tells a record processor the type and boundary of each record file and the overall structure of each record and how records are separated.

The input file is read by the driver processor 2210. The driver processor 2210 is configured with a value of degree of parallelism (DOP). A degree of parallelism (DOP) is a number that drives how many execution threads or record processors will be needed or spawned. The number of record processors can depend on physical resources available on the machine where the parallel processing code is run.

In an example embodiment, a degree of parallelism may be equal to number of hardware processors, such as central processing units (CPU's), available on machine. A machine can include, for example, a server located in a cloud, or a server located on-premises of a user. The input file record is logically broken into small size fragments where the number of fragments are the same as the DOP. A number of execution threads for processing an input file is dynamic and can vary based on a number of hardware processors available on the machine and/or can vary based on the size of the file that is being processed. Therefore, the number of execution threads that are spawned is dynamic and can vary according to each machine that is performing the processing, and according to the size of the file that is being processed. Each execution thread can process a single fragment.

The driver processor 2210 can determine a number of fragments to divide the input file. The driver processor 2210 can determine the number of fragments to divide the input file by using the virtual divider 2212 and the memory mapper 2213.

Initially, the driver processor 2210 looks at the input file size and DOP, and determines the start offset and length of each fragment based on, for example, formula 1 below:

$$\text{Size of each fragment} = (\text{file size}/\text{DOP}) \qquad (1)$$

where file size represents a size of a file in bytes and DOP represents a degree of parallelism. For example, if a length of a file is 2000 bytes and a DOP=10, the driver processor 2210 would calculate that each fragment would be of size 200 bytes. The driver processor 2210 looks at total size of input file in bytes and DOP value and divides files into DOP number of fragments. The memory mapper 2213 can be used to determining the start offset and length of each fragment. The virtual divider 2212 can be used to divide the file into fragments.

Start offset could be calculated using formula 2 below:

$$\text{Start offset of record processor} = (\text{index}) * (\text{size of each fragment}) \quad (2)$$

Index is integer sequential number assigned to each record processor starting with index=0. For example, record processor number 1 has index=0, so its offset would be 0. Similarly, record processor number 2 has index 1, and thus its start offset would be 200

The driver processor 2210 will spawn a DOP number of record processor instances. The record processor instances can be spawned using the execution thread determiner 2214. Further, the execution thread assigner 2216 assigns each record one fragment by passing a start offset and length of its assigned fragment.

In the example described above, the driver processor 2210 would indicate that start offset=0, length=200 to a first record processor instance and would indicate a start offset=200 and a length=200 to a second record processor instance and so on. This way no two record processors instances have any overlapping region of file.

Drivers start going to each of fragment's end byte and checks if the end byte is an end of record marker (e.g., newline or \n). The end of record marker is deduced from the input schema file (nXSD).

The record processor 2210 also ensures that each fragment is ending with an appropriate end of the record. Therefore, two different fragments will not share a single record.

If the end of record marker is not found at end of expected fragment byte offset, the driver processor reads further bytes until it encounters the end of record marker and can adjust the length of the fragment. The driver processor 2210 spawns a DOP number of record processors and each record processor is passed the start byte and length of its fragment to process.

By using the memory mapper 2213 to perform memory mapping, the input file does not need to be physically broken into smaller fragment files for parallel processing and block boundaries do not need to be created. Further, the execution threads are mapped to a single continuous mapping region. In accordance with an example embodiment, virtual memory mapping is performed. Therefore, read/write of data at given offset in file does not need a read/write system call.

Memory mapping is used to assign a portion of the input file to each record processor that is spawned. Memory mapping can be done using a system call (e.g., mmap on Unix/Linux Operating system). This system call (e.g., mmap system call) can use a file location, start byte in file and length of area that needs to be memory mapped. Once memory mapping is done by the operating system, a file of given start byte/length content could be accessed as if accessing an array of bytes using virtual address.

Parallel execution thread 2215, also known as parallel record processor, encapsulates the processing logic that a user wants to apply on each record. To avoid collision in an output file, each execution thread can create an output file using output file creator 2217. Each output file can have a fragment number appended to the file. The fragment number acts as a unique identifier for each of the output files. For example, if an output file is defined as Output.txt by a user, the record processor assigned for Fragment 1 will output "Output.txt1" and similarly a record processor assigned for Fragment 2 will output "Output.txt2." Output.txt1 is independent of Output.txt2. Since each record processor processes independent data sets, the output files are also independent of each other.

All of these output files (e.g., Output.txt1, Output.txt2, Output.txt3, etc) are merged by filer merger 2218 together to create a final output put, such as "final Output.txt" that will be used by the user. Since each execution thread handles a different fragment and since there are separate output files for each of the execution threads, there is no need to perform synchronization. The input dataset and the output dataset for each of the execution threads are independent of each other (e.g., of other execution threads).

Parallel execution thread 2215 uses an operating system's memory mapping logic to map a small fragment of an input file starting at a given byte offset and length. Each execution thread or record processor only processes records present in its memory mapped fragment. Each fragment could only see contents of file that were initially memory mapped using the start offset and length. This way, one execution thread cannot process a fragment of another execution thread since the fragment does not correspond to the assigned memory mapped values. Each execution thread outputs its processed output record to its own output file. After all of the execution threads are done, the filer merger 2218 merges the output files from all of the execution threads in order to create a final output file.

The output files that are output by each of the execution threads can be stored in the file storage 2219. Further, the output files that are merged to create the single final output file can also be stored in the file storage 2219. In the example shown in FIG. 22, the input file, output files, and final merged output file are stored on file storage 2219, however, the input file, output files, and final merged output file can be stored separately.

Figure 23:
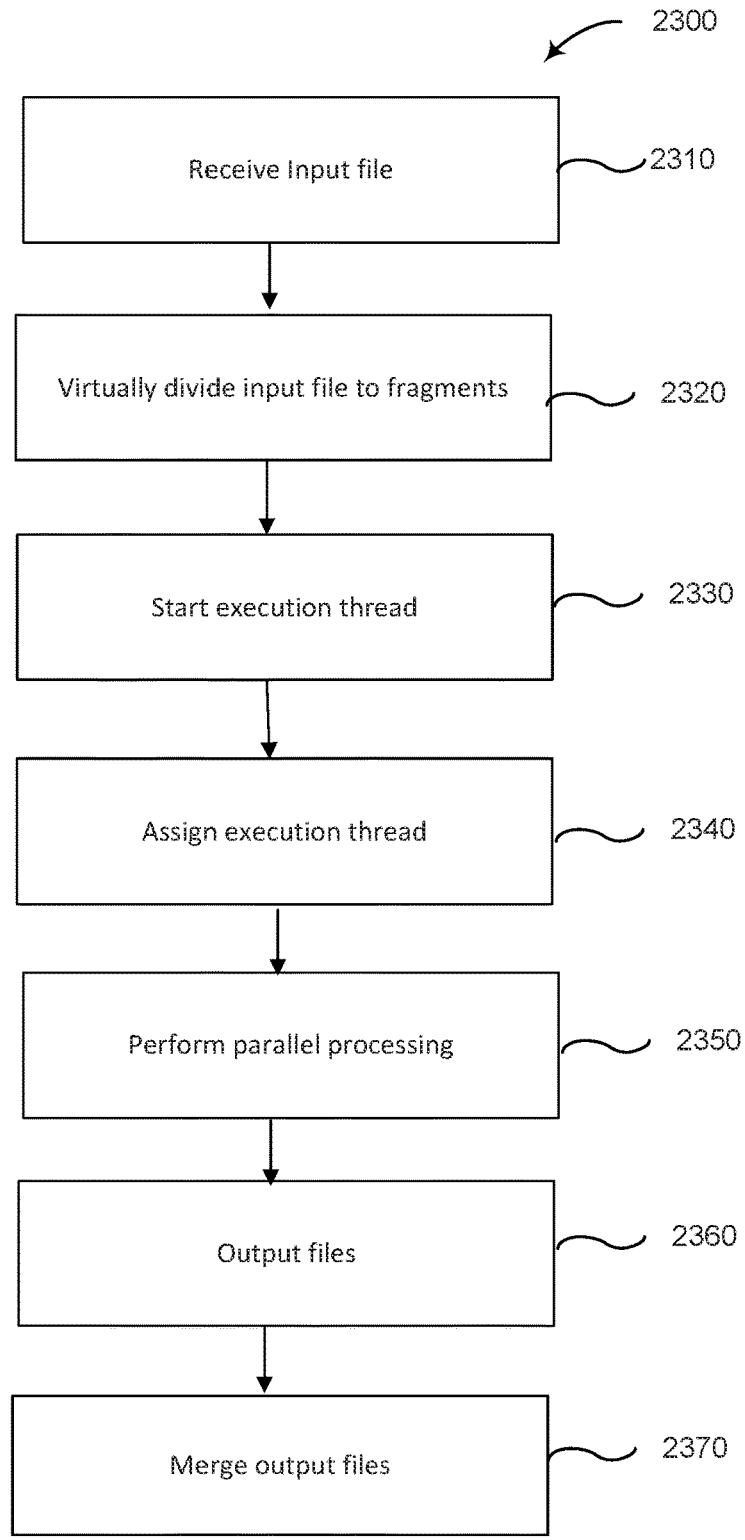
FIG. 23 illustrates a flowchart of a method for processing records, in accordance with some example embodiments.

FIG. 23 illustrates a flowchart of a method 2300 for processing records, in accordance with some example embodiments. The method of FIG. 23 can be implemented using the system of FIG. 22.

At step 2310, an input file is received. The input file can be received through file receiver 2210

At step 2320, the input file is virtually divided into fragments. The input file is virtually divided into several fragments through memory mapping. The input file can be virtually divided by virtual divider 2212 and memory mapper 2213.

At step 2330, an execution thread is started or spawned for each of the fragments. An execution thread can be started by execution thread determiner 2214.

At step 2340, and execution thread is assigned to each of the fragments. One execution thread is configured to process one fragment. Therefore, the number of execution threads will correspond to the number of fragments. Each execution thread will process a separate fragment. An execution thread can be assigned to a fragment by execution thread assigner 2216. Since there is only a single fragment for each execution thread, only a single memory mapping call is needed and multiple memory mapping calls are not needed.

At step 2350, the fragments are processed in parallel by the execution threads. The fragments can be processed in parallel by parallel execution thread 2215.

At step 2360, an output file is output for each of the fragments that are processed by the execution threads. The output files can be created by output file creator 2217.

At step 2370, the output files that are output by the execution threads are merged to create a final output file. The output files can be merged by file merger to 2280.

Figure 24:
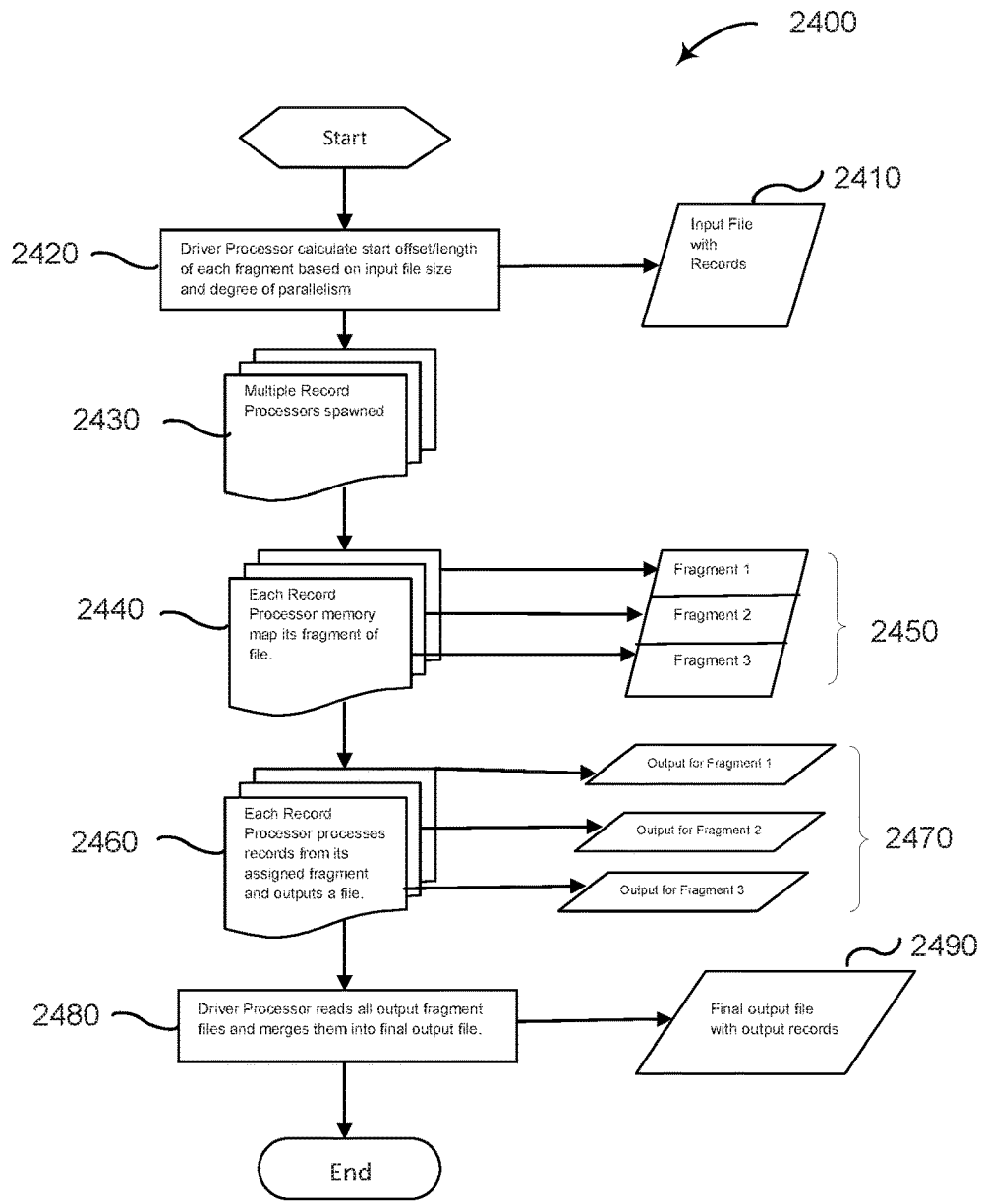
FIG. 24 illustrates a flowchart of a method for processing records, in accordance with some example embodiments.

FIG. 24 illustrates a more detailed flowchart of a method 2400 for parallel processing records, in accordance with some example embodiments.

As shown in FIG. 24, an input file is received and is divided into fragments. The input file is divided virtually through memory mapping. A record processor (execution thread) is started for each of the fragments and the record processors can process the fragments in parallel. Each of the record processors will output a file corresponding to their processed fragment and the files are merged to create a final output.

At step 2410, an input file is received. At step 2420, the driver processor calculates the start offset and length for each fragment based on the size and degree of parallelism of the input file. At step 2430, multiple record processors or execution threads are spawned. At step 2440, each record processor memory maps its fragment of file. At step 2450, multiple fragments are created. At step 2460, each record processor processes records from its assigned fragment and outputs a file. At step 2470, output files for each of the fragments that are processed by each of the execution threads are output. At step 2480, the driver processor reads all output fragment files and merges them into a final output file. At step 2490, the final output file is output along with output records. Output records are result of processing the input records.

Figure 25:
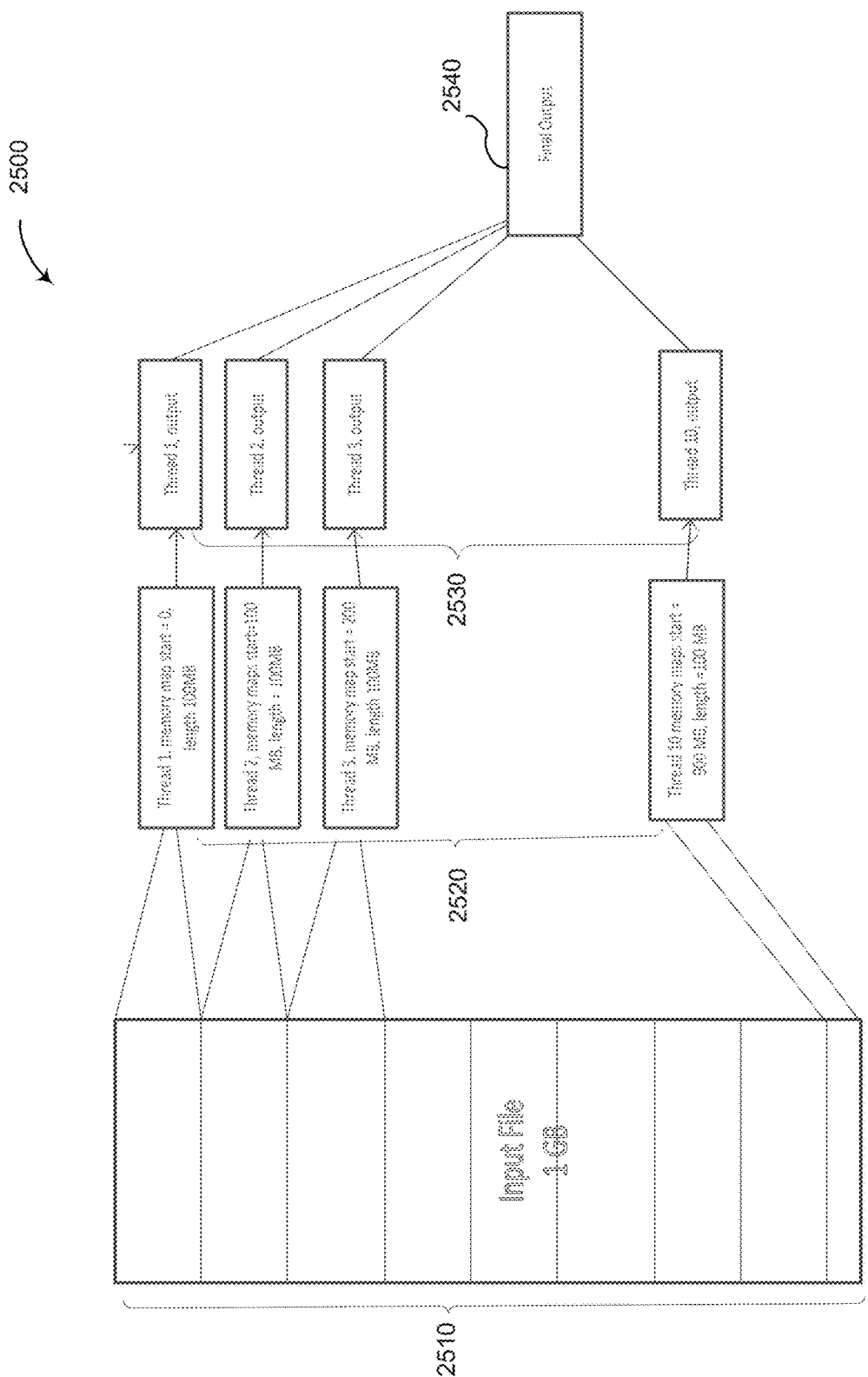
FIG. 25 illustrates a flow diagram of parallel processing records, in accordance with some example embodiments.

FIG. 25 illustrates a flow diagram 2500 of parallel processing records, in accordance with some example embodiments. As shown in FIG. 25, an input file 2510 is divided into fragments and a plurality of execution threads 2520 that process the fragments. Each of the execution threads processes a fragment of the input file according to the fragment that is assigned to the execution thread through memory mapping. Each of the execution threads 2520 outputs an output file 2530. The output files 2530 output from the execution threads 2530 are combined to create a final output file 2540.

Since records are homogenous, the order of their processing does not matter and thus all records could be processed in parallel by multiple execution threads at a same time without having to determine a relative order of processing.

Since each instance of the execution thread is working on its own assigned memory mapped region of the file, the final output may not be put into a single output file as it might change the original order of records in the final output file. To avoid this, each execution thread creates its own output file and a final merge logic merges all of the smaller output files created by the multiple instances of the execution thread in order to create a final output file.

Therefore, multiple threads are working on fragments and the individual outputs are merged to produce a final output.

FIG. 26 illustrates an example of an input schema file 2600, in accordance with some example embodiments. In the example shown in FIG. 26, the input schema file 2600 describes the structure of a comma separated value (CSV) format record. Therefore, all of the record fields are separated by a comma.

Drivers start going to each of fragment's end byte and checks if the end byte is an end of record marker (e.g., newline or \n). The end of record marker is deduced from the input schema file (nXSD) 2600. In the example shown in FIG. 26, there is nxsd:terminatedBy="${eol}" 2610 for the last field of record which means that each record ends with end of line (eol), such as \n or a newline character.

FIG. 27 illustrates an example of an input file record 2700, in accordance with some example embodiments. FIG. 27 illustrates a plurality of input XML, records in an input CSV file. An example of a single input XML record which is created after processing one input record (i.e., a single line from example data file), as per input schema is shown below:

```
<Input>
    <Date>3/1/2016</Date>
    <Operation>Balance Transfer</Operation>
    <Currency>USD</Currency>
    <Account_number>1212</Account_number>
    <Amount>20000</Amount>
</Input>
```

A user can define an XSLT/XPATH/Xquery on the input XML record in order to perform an operation that is needed as per business rules. In the following example, a user may want to read each record, extract an account number field, and an amount transferred field and put it into another file.

The user can write XSLT to convert the input XML into an output XML that only contains an account number and an amount since the user's business needs only requires extracting an account number and an amount.

One example of an output XML record could be:

```
<Output>
    <Account_number>1212</Account_number>
    <Amount>20000</Amount>
</Output>
```

The user defines the output native XML schema definition (XSD) (native XSD) to convert the output XML file back into native record format (e.g, the CSV format) which can be written to a plain text output file.

Therefore, in an example embodiment, the user can specify an input file, an input native XSD, a processing logic (e.g, XSLT/XPath/Xquery), an output native XSD, and an output file.

FIGS. 28-33 illustrate parallel processing records, in accordance with some example embodiments. As shown in FIGS. 28-33, there are 20 records 2820 (e.g., records dated from Mar. 1, 2016 to Mar. 6, 2016). Each record is 100 bytes, therefore, the file size for the 20 records is 2000 bytes (20 records×100 bytes).

Figure 28:
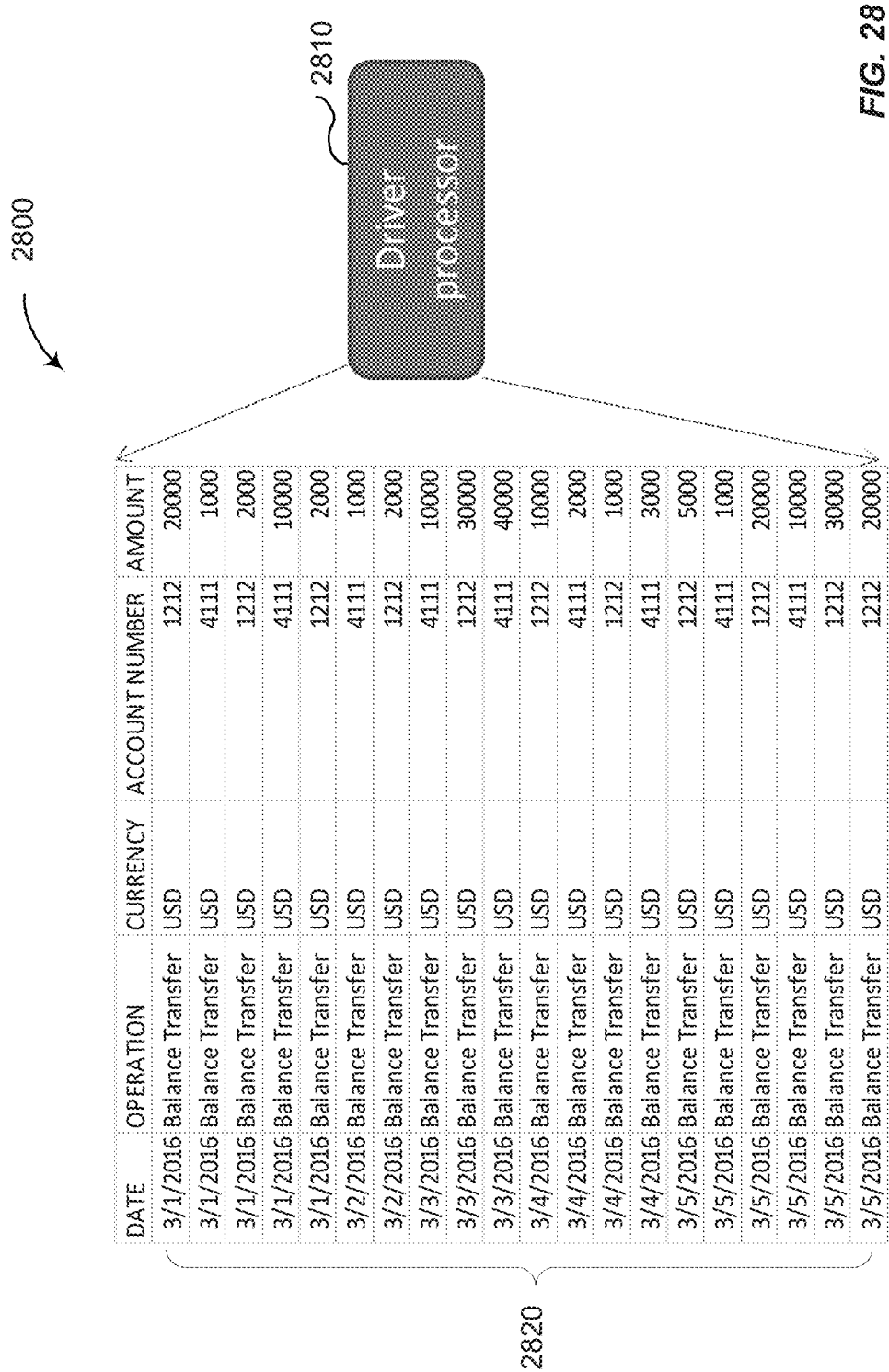

FIG. 28 illustrates the driver processor 2810 performing an initial fragment size calculation. In the example shown in FIGS. 28-33, the DOP is configured as 10. The driver processor 2810 can calculate the length of each fragment=file size/DOP=>2000/10=>200. 200 bytes fragment means each fragment has 2 records. The driver processor 2810 can find, for example, "\n" at the end of each fragment ($200^{th}$ byte, $400^{th}$ byte etc), therefore, no adjustment of fragment length is needed.

Figure 29:
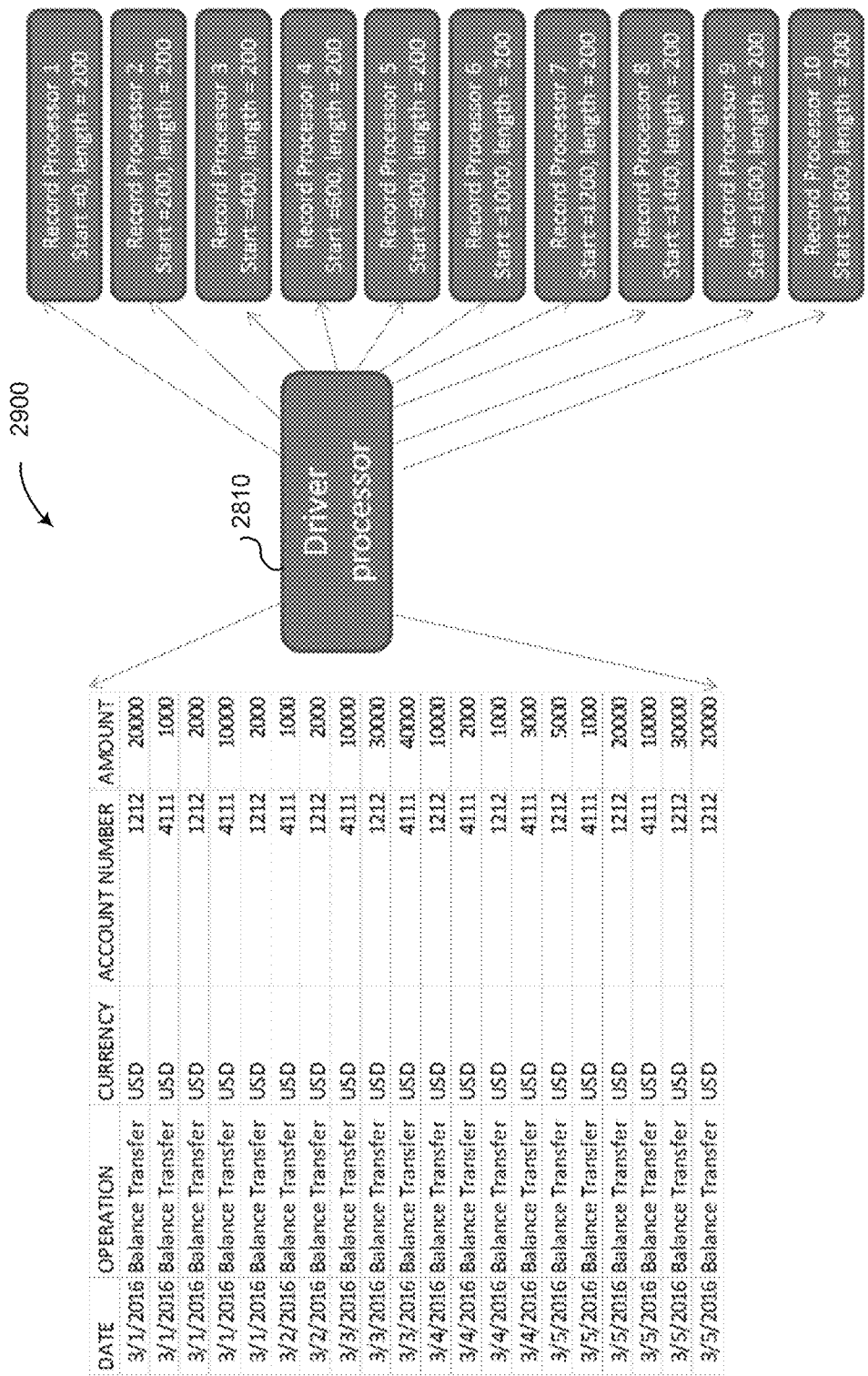

As shown in FIGS. 29-33, parallel processing is performed for each of the fragments of the input file. FIG. 29 shows that the driver processor 2810 spawns ten (10) execution threads or record processors 1-10. As shown in FIG. 30, each of the ten record processors performs memory mapping based on a start byte and length. Each record processor points to a start byte. Empty line 3010-3019 are inserted between fragments for easy visualization of the fragment boundary. The empty lines are inserted for easily visualization of fragment boundaries. Therefore, the empty lines act as a marker so that each of the fragments can be easily identified.

Figure 33:
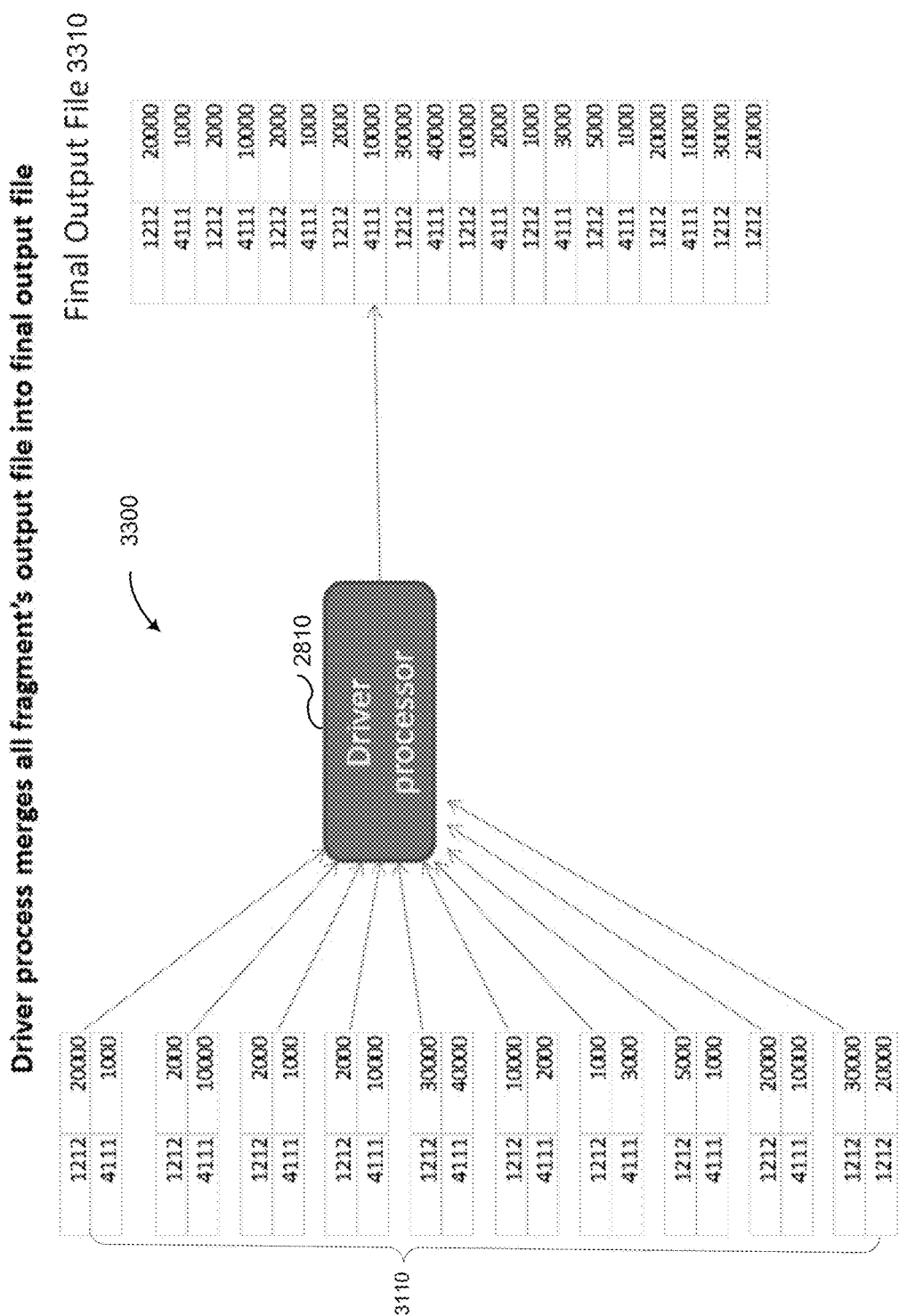

As shown in FIG. 31, the first record of each fragment is processed in parallel and its fragment output file is generated. As shown in FIG. 31, output files 3110 are output for each of the record processors. As shown in FIG. 32, the second record of each fragment is processed in parallel and the output is written to the fragment output file 3110 for the respective fragment. As shown in FIG. 33, the driver processor 2810 merges all of the output files 3110 to create a final output file 3310.

In accordance with some example embodiments, fragments of an input file are processed in parallel thus expediting the amount of time needed for processing the input file. Since each of the fragments are memory mapped, there will not be overlap regarding the processing of fragments of the input file.

Computer System

Figure 34:
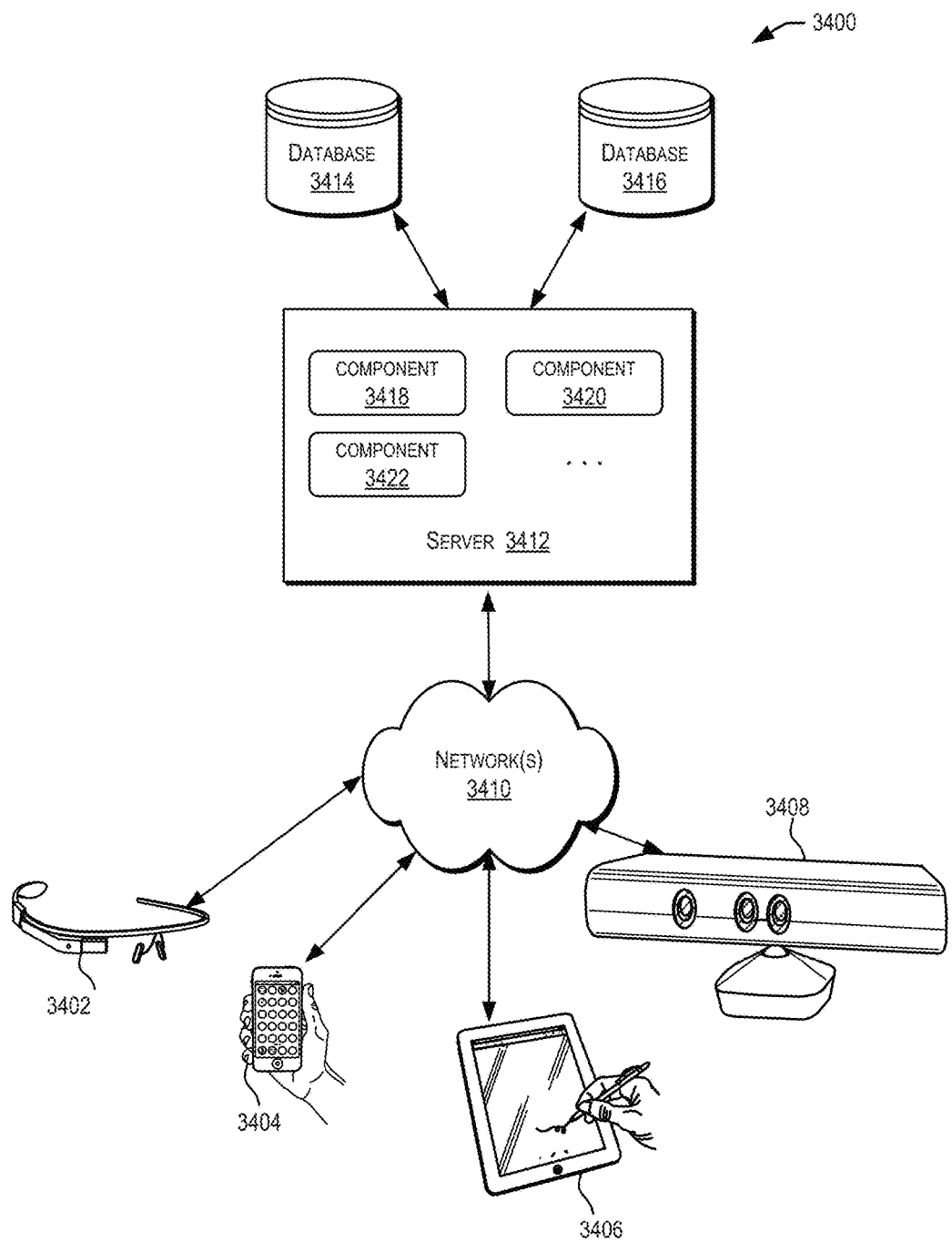
FIG. 34 depicts a simplified diagram of a distributed system, in accordance with some example embodiments.

FIG. 34 depicts a simplified diagram of a distributed system 3400 for implementing an embodiment. In the illustrated embodiment, the distributed system 3400 includes one or more client computing devices 3402, 3404, 3406, and 3408, which are configured to execute and operate a client application such as a web browser, proprietary client (e.g., Oracle Forms), or the like over one or more network(s) 3410. The server 3412 may be communicatively coupled with the remote client computing devices 3402, 3404, 3406, and 3408 via network 3410.

In various embodiments, the server 3412 may be adapted to run one or more services or software applications such as services and applications that provide message delivery services. In certain embodiments, the server 3412 may also provide other services or software applications can include non-virtual and virtual environments. In some embodiments, these services may be offered as web-based or cloud services or under a Software as a Service (SaaS) model to the users of the client computing devices 3402, 3404, 3406, and/or 3408. Users operating the client computing devices 3402, 3404, 3406, and/or 3408 may in turn utilize one or more client applications to interact with the server 3412 to utilize the services provided by these components.

In the configuration depicted in FIG. 34, the software components 3418, 3420 and 3422 of system 3400 are shown as being implemented on the server 3412. In other embodiments, one or more of the components of the system 3400 and/or the services provided by these components may also be implemented by one or more of the client computing devices 3402, 3404, 3406, and/or 3408. Users operating the client computing devices may then utilize one or more client applications to use the services provided by these components. These components may be implemented in hardware, firmware, software, or combinations thereof. It should be appreciated that various different system configurations are possible, which may be different from distributed system 3400. The embodiment shown in FIG. 34 is thus one example of a distributed system for implementing an embodiment system and is not intended to be limiting.

The client computing devices 3402, 3404, 3406, and/or 3408 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 3410.

Although distributed system 3400 in FIG. 34 is shown with four client computing devices, any number of client computing devices may be supported. Other devices, such as devices with sensors, etc., may interact with the server 3412.

The network(s) 3410 in the distributed system 3400 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 3410 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 3412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 3412 can include one or more virtual machines running virtual operating systems, or other computing architectures involving virtualization. One or more flexible pools of logical storage devices can be virtualized to maintain virtual storage devices for the server. Virtual networks can be controlled by the server 3412 using software defined networking. In various embodiments, the server 3412 may be adapted to run one or more services or software applications described in the foregoing disclosure. For example, the server 3412 may correspond to a server for performing processing as described above according to an embodiment of the present disclosure.

The server 3412 may run an operating system including any of those discussed above, as well as any commercially available server operating system. Server 3412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Example database servers include without limitation those commercially available from Oracle, Microsoft, Sybase, IBM (International Business Machines), and the like.

In some implementations, the server 3412 may include one or more applications to analyze and consolidate data feeds and/or event updates received from users of the client computing devices 3402, 3404, 3406, and 3408. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 3412 may also include one or more applications to display the data feeds and/or real-time events via one or more display devices of the client computing devices 3402, 3404, 3406, and 3408.

The distributed system 3400 may also include one or more databases 3414 and 3416. These databases may provide a mechanism for storing information such as inventory information, and other information used by example embodiments. Databases 3414 and 3416 may reside in a variety of locations. By way of example, one or more of databases 3414 and 3416 may reside on a non-transitory storage medium local to (and/or resident in) the server 3412. Alternatively, the databases 3414 and 3416 may be remote from the server 3412 and in communication with the server 3412 via a network-based or dedicated connection. In one set of embodiments, the databases 3414 and 3416 may reside in a storage-area network (SAN). Similarly, any necessary files for performing the functions attributed to the server 3412 may be stored locally on the server 3412 and/or remotely, as appropriate. In one set of embodiments, the databases 3414 and 3416 may include relational databases, such as databases provided by Oracle, that are adapted to store, update, and retrieve data in response to SQL-formatted commands.

Figure 35:
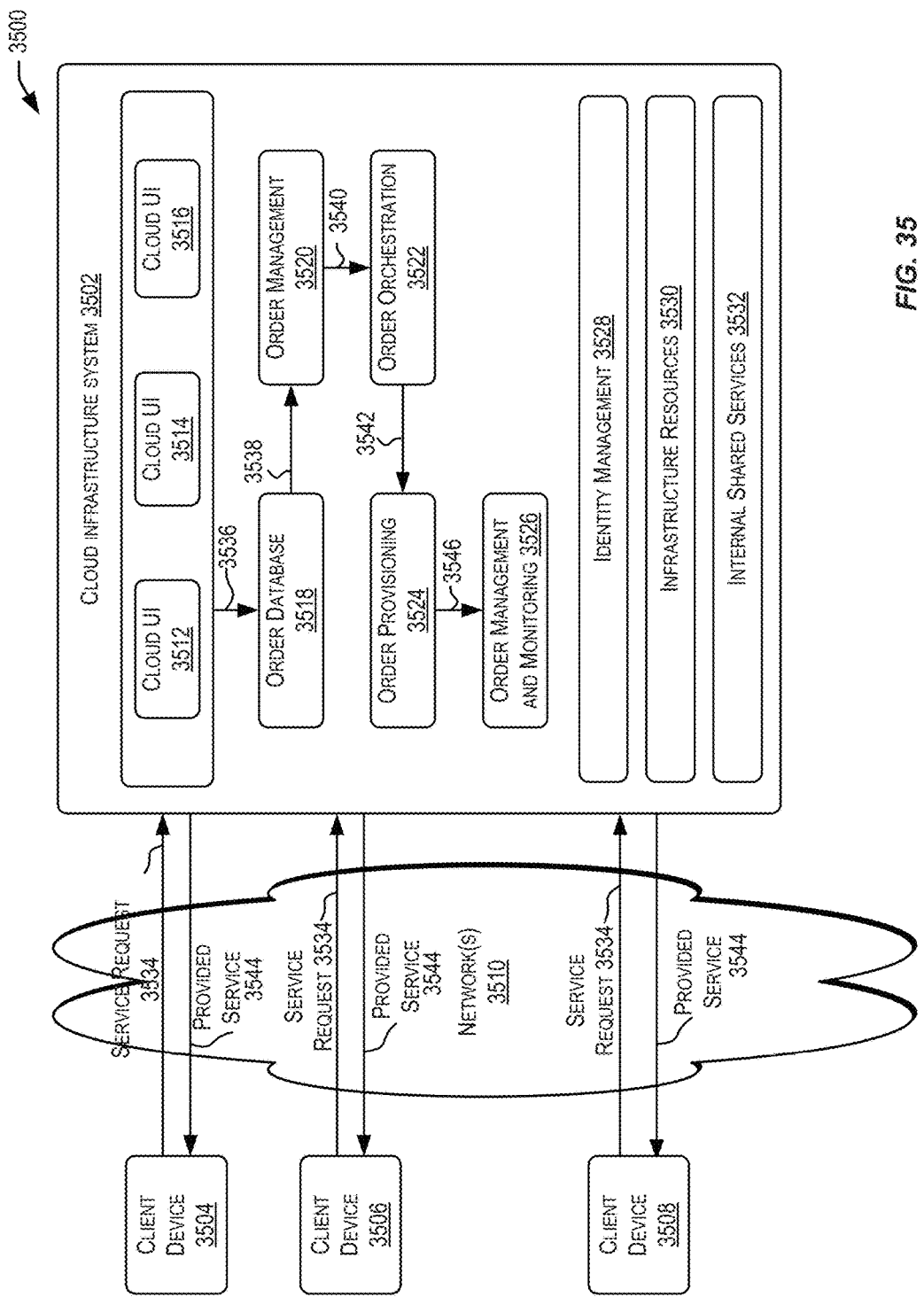
FIG. 35 is a simplified block diagram of one or more components of a system environment in which services may be offered as cloud services, in accordance with some example embodiments.

In some embodiments, the message delivery services described above may be offered as services via a cloud environment. FIG. 35 is a simplified block diagram of one or more components of a system environment 3500 in which services may be offered as cloud services, in accordance with an embodiment of the present disclosure. In the illustrated embodiment in FIG. 35, system environment 3500 includes one or more client computing devices 3504, 3506, and 3508 that may be used by users to interact with a cloud infrastructure system 3502 that provides cloud services, including services for dynamically modifying documents (e.g., webpages) responsive to usage patterns. Cloud infrastructure system 3502 may comprise one or more computers and/or servers that may include those described above.

It should be appreciated that cloud infrastructure system 3502 depicted in FIG. 35 may have other components than those depicted. Further, the embodiment shown in FIG. 35 is only one example of a cloud infrastructure system that may incorporate an example embodiment. In some other embodiments, cloud infrastructure system 3502 may have more or fewer components than shown in the figure, may combine two or more components, or may have a different configuration or arrangement of components.

Client computing devices 3504, 3506, and 3508 may be devices similar to those described above. Client computing devices 3504, 3506, and 3508 may be configured to operate a client application such as a web browser, a proprietary client application (e.g., Oracle Forms), or some other application, which may be used by a user of the client computing device to interact with cloud infrastructure system 3502 to use services provided by cloud infrastructure system 3502. Although an example system environment 3500 is shown with three client computing devices, any number of client computing devices may be supported. Other devices such as devices with sensors, etc. may interact with cloud infrastructure system 3502.

Network(s) 3510 may facilitate communications and exchange of data between clients 3504, 3506, and 3508 and cloud infrastructure system 3502. Each network may be any type of network familiar to those skilled in the art that can support data communications using any of a variety of commercially-available protocols, including those described above for network(s) 310.

In certain embodiments, services provided by cloud infrastructure system 3502 may include a host of services that are made available to users of the cloud infrastructure system on demand. In addition to services related to account management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 3502 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 3502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 3502 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 3502 may be adapted to automatically provision, manage and track a customer's subscription to services offered by cloud infrastructure system 3502. Cloud infrastructure system 3502 may provide the cloud services via different deployment models. For example, services may be provided under a public cloud model in which cloud infrastructure system 3502 is owned by an organization selling cloud services (e.g., owned by Oracle Corporation) and the services are made available to the general public or different industry enterprises. As another example, services may be provided under a private cloud model in which cloud infrastructure system 3502 is operated solely for a single organization and may provide services for one or more entities within the organization. The cloud services may also be provided under a community cloud model in which cloud infrastructure system 3502 and the services provided by cloud infrastructure system 3502 are shared by several organizations in a related community. The cloud services may also be provided under a hybrid cloud model, which is a combination of two or more different models.

In some embodiments, the services provided by cloud infrastructure system 3502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 3502. Cloud infrastructure system 3502 then performs processing to provide the services in the customer's subscription order.

In some embodiments, the services provided by cloud infrastructure system 3502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 3502 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 3502 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 3502 may also include infrastructure resources 3530 for providing the resources used to provide various services to customers of the cloud infrastructure system. In one embodiment, infrastructure resources 3530 may include pre-integrated and optimized combinations of hardware, such as servers, storage, and networking resources to execute the services provided by the PaaS platform and the SaaS platform, and other resources.

In some embodiments, resources in cloud infrastructure system 3502 may be shared by multiple users and dynamically re-allocated per demand. Additionally, resources may be allocated to users in different time zones. For example, cloud infrastructure system 3502 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 3532 may be provided that are shared by different components or modules of cloud infrastructure system 3502 to enable provision of services by cloud infrastructure system 3502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 3502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 3502, and the like.

In one embodiment, as depicted in FIG. 35, cloud management functionality may be provided by one or more modules, such as an order management module 3520, an order orchestration module 3522, an order provisioning module 3524, an order management and monitoring module 3526, and an identity management module 3528. These modules may include or be provided using one or more computers and/or servers, which may be general purpose computers, specialized server computers, server farms, server clusters, or any other appropriate arrangement and/or combination.

In an example operation, at 3534, a customer using a client device, such as client device 3504, 3506 or 3508, may interact with cloud infrastructure system 3502 by requesting one or more services provided by cloud infrastructure system 3502 and placing an order for a subscription for one or more services offered by cloud infrastructure system 3502. In certain embodiments, the customer may access a cloud User Interface (UI) such as cloud UI 3512, cloud UI 3514 and/or cloud UI 3516 and place a subscription order via these UIs. The order information received by cloud infrastructure system 3502 in response to the customer placing an order may include information identifying the customer and one or more services offered by the cloud infrastructure system 3502 that the customer intends to subscribe to.

At 3536, the order information received from the customer may be stored in an order database 3518. If this is a new order, a new record may be created for the order. In one embodiment, order database 3518 can be one of several databases operated by cloud infrastructure system 3518 and operated in conjunction with other system elements.

At 3538, the order information may be forwarded to an order management module 3520 that may be configured to perform billing and accounting functions related to the order, such as verifying the order, and upon verification, booking the order.

At 3540, information regarding the order may be communicated to an order orchestration module 3522 that is configured to orchestrate the provisioning of services and resources for the order placed by the customer. In some instances, order orchestration module 3522 may use the services of order provisioning module 3524 for the provisioning. In certain embodiments, order orchestration module 3522 enables the management of business processes associated with each order and applies business logic to determine whether an order should proceed to provisioning.

As shown in the embodiment depicted in FIG. 35, at 3542, upon receiving an order for a new subscription, order orchestration module 3522 sends a request to order provisioning module 3524 to allocate resources and configure resources needed to fulfill the subscription order. Order provisioning module 3524 enables the allocation of resources for the services ordered by the customer. Order provisioning module 3524 provides a level of abstraction between the cloud services provided by cloud infrastructure system 3500 and the physical implementation layer that is used to provision the resources for providing the requested services. This enables order orchestration module 3524 to be isolated from implementation details, such as whether or not services and resources are actually provisioned on the fly or pre-provisioned and only allocated/assigned upon request.

At 3544, once the services and resources are provisioned, a notification may be sent to the subscribing customers indicating that the requested service is now ready for use. In some instance, information (e.g. a link) may be sent to the customer that enables the customer to start using the requested services.

At 3546, a customer's subscription order may be managed and tracked by an order management and monitoring module 3526. In some instances, order management and monitoring module 3526 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 3500 may include an identity management module 3528 that is configured to provide identity services, such as access management and authorization services in cloud infrastructure system 3500. In some embodiments, identity management module 3528 may control information about customers who wish to utilize the services provided by cloud infrastructure system 3502. Such information can include information that authenticates the identities of such customers and information that describes which actions those customers are authorized to perform relative to various system resources (e.g., files, directories, applications, communication ports, memory segments, etc.) Identity management module 3528 may also include the management of descriptive information about each customer and about how and by whom that descriptive information can be accessed and modified.

Figure 36:
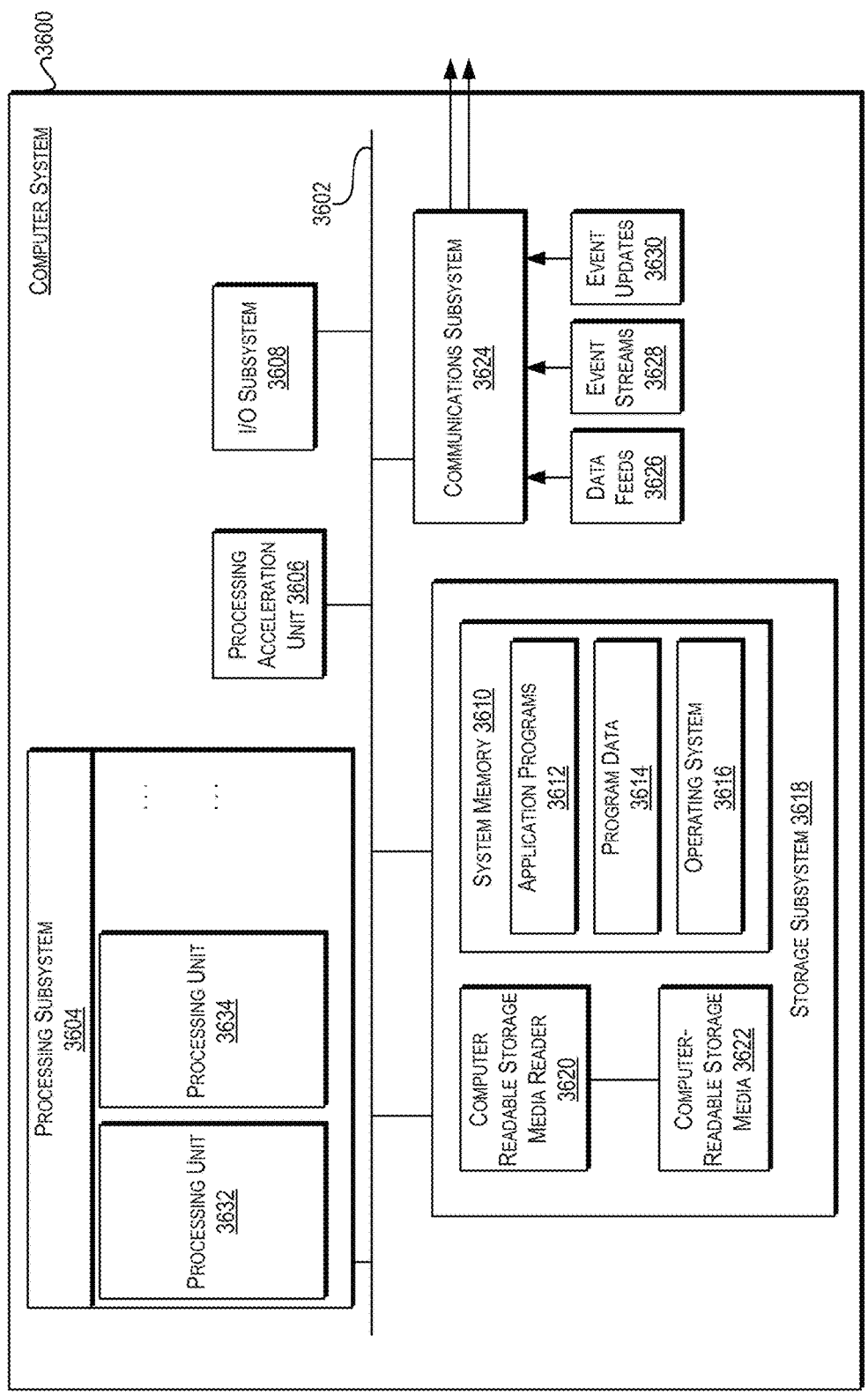
FIG. 36 illustrates a computer system that may be used to implement some of the example embodiments.

FIG. 36 illustrates an example computer system 3600 that may be used to implement an example embodiment. In some embodiments, computer system 3600 may be used to implement any of the various servers and computer systems described above. As shown in FIG. 36, computer system 3600 includes various subsystems including a processing subsystem 3604 that communicates with a number of peripheral subsystems via a bus subsystem 3602. These peripheral subsystems may include a processing acceleration unit 3606, an I/O subsystem 3608, a storage subsystem 3618 and a communications subsystem 3624. Storage subsystem 3618 may include tangible computer-readable storage media 3622 and a system memory 3610.

Bus subsystem 3602 provides a mechanism for letting the various components and subsystems of computer system 3600 communicate with each other as intended. Although bus subsystem 3602 is shown schematically as a single bus, alternative embodiments of the bus subsystem may utilize multiple buses. Bus subsystem 3602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 3604 controls the operation of computer system 3600 and may comprise one or more processing units 3632, 3634, etc. A processing unit may include be one or more processors, including single core or multicore processors, one or more cores of processors, or combinations thereof. In some embodiments, processing subsystem 3604 can include one or more special purpose co-processors such as graphics processors, digital signal processors (DSPs), or the like. In some embodiments, some or all of the processing units of processing subsystem 3604 can be implemented using customized circuits, such as application specific integrated circuits (ASICs), or field programmable gate arrays (FPGAs).

In some embodiments, the processing units in processing subsystem 3604 can execute instructions stored in system memory 3610 or on computer readable storage media 3622. In various embodiments, the processing units can execute a variety of programs or code instructions and can maintain multiple concurrently executing programs or processes. At any given time, some or all of the program code to be executed can be resident in system memory 3610 and/or on computer-readable storage media 3610 including potentially on one or more storage devices. Through suitable programming, processing subsystem 3604 can provide various functionalities described above for dynamically modifying documents (e.g., webpages) responsive to usage patterns.

In certain embodiments, a processing acceleration unit 3606 may be provided for performing customized processing or for off-loading some of the processing performed by processing subsystem 3604 so as to accelerate the overall processing performed by computer system 3600.

I/O subsystem 3608 may include devices and mechanisms for inputting information to computer system 3600 and/or for outputting information from or via computer system 3600. In general, use of the term "input device" is intended to include all possible types of devices and mechanisms for inputting information to computer system 3600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 3600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 3618 provides a repository or data store for storing information that is used by computer system 3600. Storage subsystem 3618 provides a tangible non-transitory computer-readable storage medium for storing the basic programming and data constructs that provide the functionality of some embodiments. Software (programs, code modules, instructions) that when executed by processing subsystem 3604 provide the functionality described above may be stored in storage subsystem 3618. The software may be executed by one or more processing units of processing subsystem 3604. Storage subsystem 3618 may also provide a repository for storing data used in accordance with the example embodiments.

Storage subsystem 3618 may include one or more non-transitory memory devices, including volatile and non-volatile memory devices. As shown in FIG. 36, storage subsystem 3618 includes a system memory 3610 and a computer-readable storage media 3622. System memory 3610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 3600, such as during start-up, may typically be stored in the ROM. The RAM typically contains data and/or program modules that are presently being operated and executed by processing subsystem 3604. In some implementations, system memory 3610 may include multiple different types of memory, such as static random access memory (SRAM) or dynamic random access memory (DRAM).

By way of example, and not limitation, as depicted in FIG. 36, system memory 3610 may store application programs 3612, which may include client applications, Web browsers, mid-tier applications, relational database management systems (RDBMS), etc., program data 3614, and an operating system 3616. By way of example, operating system 3616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 3622 may store programming and data constructs that provide the functionality of some embodiments. Software (programs, code modules, instructions) that when executed by processing subsystem 3604 a processor provide the functionality described above may be stored in storage subsystem 3618. By way of example, computer-readable storage media 3622 may include non-volatile memory such as a hard disk drive, a magnetic disk drive, an optical disk drive such as a CD ROM, DVD, a Blu-Ray® disk, or other optical media. Computer-readable storage media 3622 may include, but is not limited to, Zip® drives, flash memory cards, universal serial bus (USB) flash drives, secure digital (SD) cards, DVD disks, digital video tape, and the like. Computer-readable storage media 3622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 3622 may provide storage of computer-readable instructions, data structures, program modules, and other data for computer system 3600.

In certain embodiments, storage subsystem 3600 may also include a computer-readable storage media reader 3620 that can further be connected to computer-readable storage media 3622. Together and, optionally, in combination with system memory 3610, computer-readable storage media 3622 may comprehensively represent remote, local, fixed, and/or removable storage devices plus storage media for storing computer-readable information.

In certain embodiments, computer system 3600 may provide support for executing one or more virtual machines. Computer system 3600 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 3600. Accordingly, multiple operating systems may potentially be run concurrently by computer system 3600. Each virtual machine generally runs independently of the other virtual machines.

Communications subsystem 3624 provides an interface to other computer systems and networks. Communications subsystem 3624 serves as an interface for receiving data from and transmitting data to other systems from computer system 3600. For example, communications subsystem 3624 may enable computer system 3600 to establish a communication channel to one or more client devices via the Internet for receiving and sending information from and to the client devices.

Communication subsystem 3624 may support both wired and/or wireless communication protocols. For example, in certain embodiments, communications subsystem 3624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 3624 can provide wired network connectivity (e.g., Ethernet) in addition to or instead of a wireless interface.

Communication subsystem 3624 can receive and transmit data in various forms. For example, in some embodiments, communications subsystem 3624 may receive input communication in the form of structured and/or unstructured data feeds 3626, event streams 3628, event updates 3630, and the like. For example, communications subsystem 3624 may be configured to receive (or send) data feeds 3626 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 3624 may be configured to receive data in the form of continuous data streams, which may include event streams 3628 of real-time events and/or event updates 3630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 3624 may also be configured to output the structured and/or unstructured data feeds 3626, event streams 3628, event updates 3630, and the like to one or more databases that may be in communication with one or more streaming data source computers coupled to computer system 3600.

Computer system 3600 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 3600 depicted in FIG. 36 is intended only as a specific example. Many other configurations having more or fewer components than the system depicted in FIG. 36 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the example embodiments. The example embodiments are not restricted to operation within certain specific data processing environments, but are free to operate within a plurality of data processing environments. Additionally, although example embodiments have been described using a particular series of transactions and steps, it should be apparent to those skilled in the art that the scope of the example embodiments are not limited to the described series of transactions and steps. Various features and aspects of the above-described embodiments may be used individually or jointly.

Further, while example embodiments have been described using a particular combination of hardware and software, it should be recognized that other combinations of hardware and software are also within the scope of the example embodiments. The example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving an input file;
   virtually dividing the input file into a plurality of fragments through memory mapping, wherein virtually dividing the input file into a plurality of fragments through memory mapping comprises:
      determining a start offset for each of the plurality of fragments;
      determining a length of each of the plurality of fragments; and
      virtually dividing the input file based on the determined start offset and the determined length for each of the plurality of fragments;
   starting an execution thread for each of the plurality of fragments;
   assigning the execution thread to each of the plurality of fragments, wherein one execution thread of a plurality of execution threads is configured to process one of the plurality of fragments;
   processing in parallel, by each of a plurality of execution threads, the plurality of fragments;
   outputting, by each of the execution threads, an output file corresponding to each of the processed plurality of fragments; and
   merging a plurality of output files output by each of the execution threads to create a final output file.

2. The method according to claim 1, wherein a number of execution threads that are started for each of the plurality of fragments is based on a degree of parallelism.

3. The method according to claim 2, wherein the degree of parallelism is based on a number of hardware processors available on a system.

4. The method according to claim 1, wherein each of the output files output by the execution threads includes a unique identifier for identifying each of the output files for each of the execution threads.

5. The method according to claim 1, wherein each of the plurality of fragments of the input file are separated by an identifying marker for identifying fragment boundaries.

6. The method according to claim 1, wherein a first output file for a first execution thread of the plurality of execution threads is independent of a second output file for a second execution thread of the plurality of execution threads.

7. The method according to claim 1, wherein the input file is memory mapped to a single continuous mapping region.

8. A non-transitory computer-readable storage medium storing a plurality of instructions executable by one or more processors, the plurality of instructions comprising:
   receiving an input file;
   virtually dividing the input file into a plurality of fragments through memory mapping, wherein virtually dividing the input file into a plurality of fragments through memory mapping comprises:
      determining a start offset for each of the plurality of fragments;
      determining a length of each of the plurality of fragments; and
      virtually dividing the input file based on the determined start offset and the determined length for each of the plurality of fragments,
   starting an execution thread for each of the plurality of fragments;
   assigning the execution thread to each of the plurality of fragments, wherein one execution thread of a plurality of execution threads is configured to process one of the plurality of fragments;
   processing in parallel, by each of a plurality of execution threads, the plurality of fragments;
   outputting, by each of the execution threads, an output file corresponding to each of the processed plurality of fragments; and
   merging a plurality of output files output by each of the execution threads to create a final output file.

9. The computer-readable storage medium according to claim 8, wherein a number of execution threads that are started for each of the plurality of fragments is based on a degree of parallelism.

10. The computer-readable storage medium according to claim 9, wherein the degree of parallelism is based on a number of hardware processors available on a system.

11. The computer-readable storage medium according to claim 8, wherein each of the output files output by the execution threads includes a unique identifier for identifying each of the output files for each of the execution threads.

12. The computer-readable storage medium according to claim 8, wherein each of the plurality of fragments of the input file are separated by an identifying marker for identifying fragment boundaries.

13. The computer-readable storage medium according to claim 8, wherein a first output file for a first execution thread of the plurality of execution threads is independent of a second output file for a second execution thread of the plurality of execution threads.

14. The computer-readable storage medium according to claim 8, wherein the input file is memory mapped to a single continuous mapping region.

15. A system comprising:
   one or more processors; and
   a memory coupled with and readable by the one or more processors, the memory configured to store a set of instructions which, when executed by the one or more processors, causes the one or more processors to:
   receive an input file;
   virtually divide the input file into a plurality of fragments through memory mapping, wherein virtually dividing the input file into a plurality of fragments through memory mapping comprises:
      determine a start offset for each of the plurality of fragments;
      determine a length of each of the plurality of fragments; and
      virtually divide the input file based on the determined start offset and the determined length for each of the plurality of fragments;
   start an execution thread for each of the plurality of fragments;
   assign the execution thread to each of the plurality of fragments, wherein one execution thread of a plurality of execution threads is configured to process one of the plurality of fragments;

process in parallel, by each of a plurality of execution threads, the plurality of fragments;

output, by each of the execution threads, an output file corresponding to each of the processed plurality of fragments; and merge a plurality of output files output by each of the execution threads to create a final output file.

* * * * *

UNITED STATES PATENT AND TRADEMARK OFFICE
CERTIFICATE OF CORRECTION

PATENT NO. : 10,372,488 B2
APPLICATION NO. : 15/705811
DATED : August 6, 2019
INVENTOR(S) : Misra Page 1 of 1

It is certified that error appears in the above-identified patent and that said Letters Patent is hereby corrected as shown below:

In the Specification

In Column 4, Line 27, delete "XML," and insert -- XML --, therefor.

In Column 5, Line 15, delete "200" and insert -- 200. --, therefor.

In Column 6, Line 44, delete "2210" and insert -- 2210. --, therefor.

In Column 8, Line 3, delete "XML," and insert -- XML --, therefor.

Signed and Sealed this
Twenty-eighth Day of July, 2020

Andrei Iancu
*Director of the United States Patent and Trademark Office*